United States Patent [19]

Huang

[11] Patent Number: 5,548,781
[45] Date of Patent: Aug. 20, 1996

[54] DATA COMMUNICATION APPARATUS AND METHOD FOR SWITCHING FROM G3 AND COMPATIBLE MODE TO ECM MODE BY INVERTING PROTOCOL MESSAGE SIGNAL

[75] Inventor: Yu E. Huang, San Jose, Calif.

[73] Assignee: Ricoh Corporation, San Jose, Calif.

[21] Appl. No.: 88,843

[22] Filed: Jul. 8, 1993

[51] Int. Cl.$^6$ ................................ H04N 1/00; H04N 1/42
[52] U.S. Cl. ................ 395/831; 379/100; 358/442; 364/DIG. 1; 364/222.2; 364/240.8; 364/DIG. 2; 364/919.1; 364/927.92
[58] Field of Search ................ 395/200.14, 200.18, 395/821, 831; 358/405, 468, 262.1, 442, 443, 445; 379/100

[56] References Cited

U.S. PATENT DOCUMENTS 5,159,465  10/1992  Maemura et al. ................ 358/405
5,220,439   6/1993  Yoshida ........................... 358/404

Primary Examiner—Thomas C. Lee
Assistant Examiner—D. Dinh
Attorney, Agent, or Firm—Stephen M. Knauer

[57] ABSTRACT

A data communication apparatus and associated method for switching from the Compatible mode to the ECM mode. The data communication apparatus receives a protocol message transmitted by a second data communication apparatus in accordance with a Compatible mode of operation. The first data communication apparatus then inverts the polarity of the received protocol message so that the inverted polarity protocol message is formatted in accordance with a G3 mode of operation. Then, the first data communication apparatus determines from the inverted polarity protocol message that the second data communication apparatus will receive the image data if it is transmitted in accordance with an ECM mode of operation. The image data is then transmitted in accordance with the ECM mode of operation to the second data communication apparatus.

12 Claims, 15 Drawing Sheets

DATA COMMUNICATION APPARATUS AND METHOD FOR SWITCHING FROM G3 AND COMPATIBLE MODE TO ECM MODE BY INVERTING PROTOCOL MESSAGE SIGNAL

FIELD OF THE INVENTION

The present invention relates generally to data communication apparatuses and methods for correcting errors in transmitted data. In particular, it pertains to data communication apparatuses and methods for switching from a compatible mode to an error correction mode.

BACKGROUND OF THE INVENTION

Many data communication apparatuses, such as facsimile (FAX) machines, use a CCITT Group 3 (G3) mode of operation. For protocol communications, the G3 mode employs a High level Data Link Control (HDLC) format. Furthermore, some facsimile machines use zero bit insertion in conjunction with the G3 mode protocol communications. For the transmission and reception of image data, the G3 mode employs a compressed data format.

In the G3 mode, data may be improperly received by the receiving facsimile machine. If this occurs, the receiving data communication apparatus will not reproduce the image associated with the improperly received data. As a result, the user must repeat the transmission process in order for the receiving data communication apparatus to reproduce this image.

Data communication apparatuses and associated methods have however been developed to correct this problem. This involves switching from the G3 mode to the CCITT T.30 Annex A error correction method (ECM) mode. In the ECM mode, the image data is formatted into data frames. The receiving data communication apparatus will indicate to the transmitting data communication apparatus which frames of a data block where improperly received. Then, the transmitting data communication apparatus, without involvement by the user, will retransmit the improperly received data frames.

The ECM mode employs an HDLC data format similar to the HDLC protocol format used in the G3 mode. Furthermore, as is the case in the G3 mode, some data communication apparatuses use zero bit insertion in the ECM mode. As a result, it is relatively easy to switch from the G3 mode to the error correction mode for transmission and reception of the image data.

However, some data communication apparatuses use a Compatible mode rather than a G3 mode of operation for secured transmissions. For protocol communications, the Compatible mode has an inverted HDLC protocol format and does not employ zero bit insertion. For transmission and reception of image data, the Compatible mode has an inverted compressed data format.

As is the case in the G3 mode, data may be improperly received by the receiving data communication apparatus in the Compatible mode. However, because of the lack of similarity between the ECM mode and the Compatible mode, data communication apparatuses and associated methods have not yet been developed for switching from the Compatible mode to the ECM mode of operation.

OBJECTS OF THE INVENTION

It is therefore an object of the invention to provide a data communication apparatus and an associated method for easily switching from the Compatible mode to the ECM mode.

It is another object of the invention to provide a data communication apparatus which includes a single ECM mode transmit phase table and a single ECM mode receive phase table to be used in conjunction with either the G3 mode or the Compatible mode.

SUMMARY OF THE INVENTION

The foregoing and other objects of the invention may generally be achieved by a data communication apparatus and associated method for switching from the Compatible mode to the ECM mode. This switching may occur for either the transmission or reception of image data.

In the case of transmitting image data, the transmitting data communication apparatus receives a protocol message transmitted by the receiving data communication apparatus in accordance with a Compatible mode of operation. The transmitting data communication apparatus then inverts the polarity of the received protocol message so that the inverted polarity protocol message is reformatted in accordance with a G3 mode of operation. Then, the transmitting data communication apparatus determines from the inverted polarity protocol message that the receiving data communication apparatus will receive the image data if it is transmitted in accordance with an ECM mode of operation. The image data is then transmitted in accordance with the ECM mode of operation by the transmitting data communication apparatus to the receiving data communication apparatus.

In the case of receiving the image data, the receiving data communication apparatus receives a protocol message transmitted by the transmitting data communication apparatus in accordance with a Compatible mode of operation. The polarity of the received protocol message is then inverted so that the protocol message is reformatted in accordance with a G3 mode of operation. The receiving data communication apparatus then determines from the inverted polarity protocol message that the transmitting data communication apparatus will transmit the image data in accordance with an ECM mode of operation. The image data is then received by the receiving data communication apparatus in accordance with the ECM mode.

BRIEF DESCRIPTION OF THE DRAWINGS

The foregoing and other objects of the invention will be more clearly understood from the following detailed description and appended claims when read in connection with the following drawings, in which:

DESCRIPTION OF THE PREFERRED EMBODIMENT

FIGS. 1–7 provide illustrations for the data communication apparatus and associated method described herein. In these figures, like components are designated by like numerals.

Figure 1:
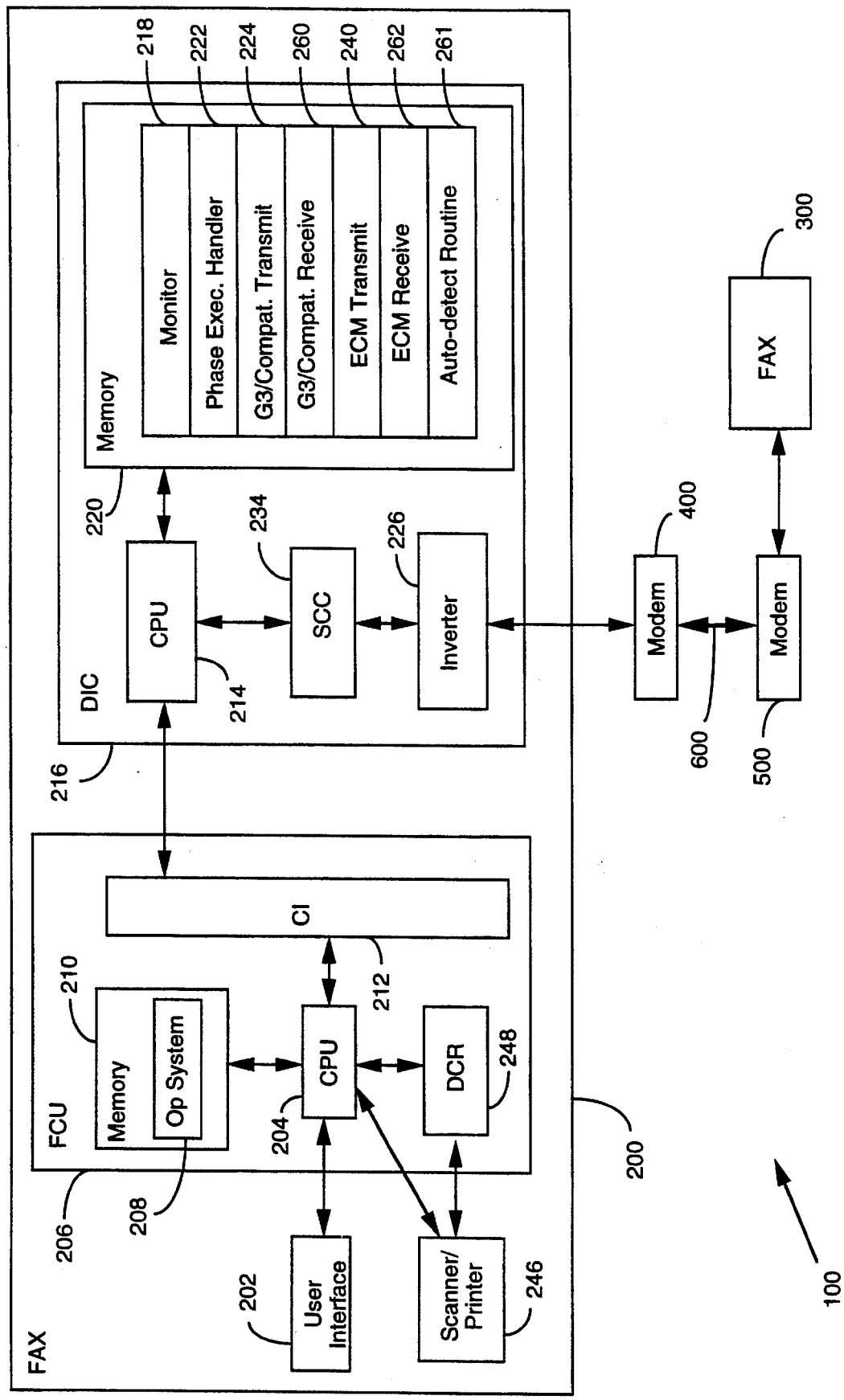
FIG. 1 shows a block diagram of a data communication network in accordance with the invention.

FIG. 1 shows a block diagram of a data communication network 100. Included in the network 100 are data communication apparatuses 200 and 300. In the embodiment shown in FIG. 1, the data communication apparatus 200 and 300 are facsimile (FAX) machines. FAX machines 200 and 300 are respectively coupled to modems 400 and 500. Modems 400 and 500 are linked by communication line 600.

The FAX machine 200 has several modes of operation for transmitting and receiving data representing an image on a page of a document. These include a CCITT Group 3 (G3) mode, a Compatible mode, and a CCITT error correction method (ECM) mode. The ECM mode is used in conjunction with either the G3 mode or the Compatible mode.

The FAX machine 300 has either a Compatible or G3 mode and also has an ECM mode. If FAX machine 300 has the Compatible mode, the ECM mode may be used in conjunction with the Compatible mode. If FAX machine 300 has the G3 mode, the ECM mode may be used in conjunction with the G3 mode.

When FAX machine 200 is to transmit image data to or receive image data from FAX machine 300, it conducts a handshaking procedure with FAX machine 300 prior to the image data being transmitted. This handshaking process includes the exchange of protocol messages formatted in accordance with the Compatible mode if FAX machine 300 has the Compatible mode and formatted in accordance with the G3 mode if FAX machine 300 has the G3 mode. The protocol messages are used to initialize the FAX machines 200 and 300 for the subsequent transmittal of the image data. For example, these protocol messages may be used to switch the FAX machines 200 and 300 from the Compatible or G3 modes to the ECM mode. On the other hand, these protocol messages may also be used to simply prepare FAX machines 200 and 300 for transmittal and reception of the image data in the Compatible or G3 modes.

Formats for the G3, Compatible, and ECM modes

Figure 2:
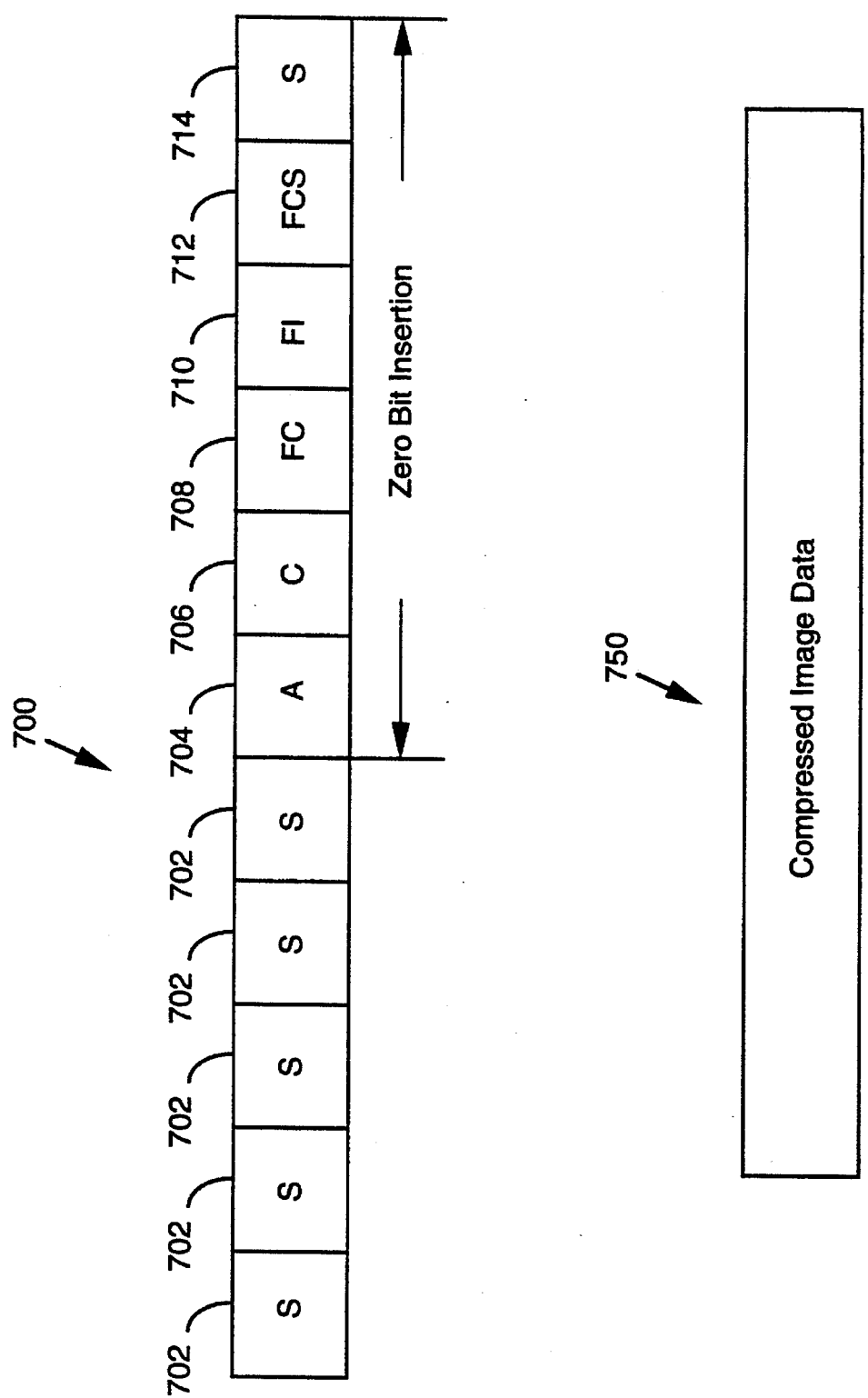
FIG. 2 shows the protocol and data formats associated with the G3 mode of operation.

FIG. 2 shows the formats associated with the G3 mode. It employs a High level Data Link Control (HDLC) format 700 comprising a sequence of symbols 702–714. Furthermore, it employs a compressed data format 750 for the image data being transmitted or received.

The synchronization (S) symbols 702 in the protocol format 700 for the G3 mode are sent sequentially in a stream. This is done in order that the FAX machines 200 and 300 can be synchronized to receive the next protocol message or image data.

In a multi-point connected FAX network, the address (A) symbol 704 provides identification of the specific FAX machine which is to receive the protocol message. However, where transmission occurs over a general switched telephone network, the address symbol 704 is limited to a single format.

The control (C) symbol 706 is used to indicate whether the currently transmitted protocol message is the final or non-final protocol message of the handshaking procedure.

The FAX control (FC) symbol 708 identifies the type of protocol that is being transmitted or received by the FAX machines 200 and 300. These protocols are used in the handshaking procedure between the FAX machines 200 and 300 prior to and after image data has been transmitted from one to the other.

The FAX information (FI) symbols 710 contain information associated with each protocol message. This information is critical in initializing the FAX machines 00 and 300 for transmittal of the image data.

The frame checking sequence (FCS) symbols 712 are used to ensure that the protocol messages are properly received by the FAX machines 200 and 300. In the preferred embodiment, the frame checking sequence symbols are generated from a cyclical redundancy checking algorithm. In this scheme, the symbols 704–710 represent the image data while the frame checking symbols represent a checksum. The checksum is generated from the division of the image data with a selected polynomial.

The synchronization (S) symbol 714 is used to indicate to the FAX machines 200 and 300 that the protocol message is over and that no more symbols will be received for that message.

In the preferred embodiment, the G3 protocol messages are generated with the symbols 702–714 being 8 bit bytes. Once the G3 protocol message has been generated, zero bits are inserted only into the symbols 704–714. Thus, the symbols 704–714 have 9 bits after the zero bit insertion operation has taken place. The zero bit is inserted in order to distinguish the symbols 704–714 from the synchronization symbols 702. The bits used to represent the symbols 702–714 have positive polarity.

The data format 750 comprises compressed data representing the image on the page being transmitted. Conventional data compression techniques are used to reduce (i.e. compress) the number of bits which represent the image. The bits used to represent the image data have positive polarity.

Figure 3:
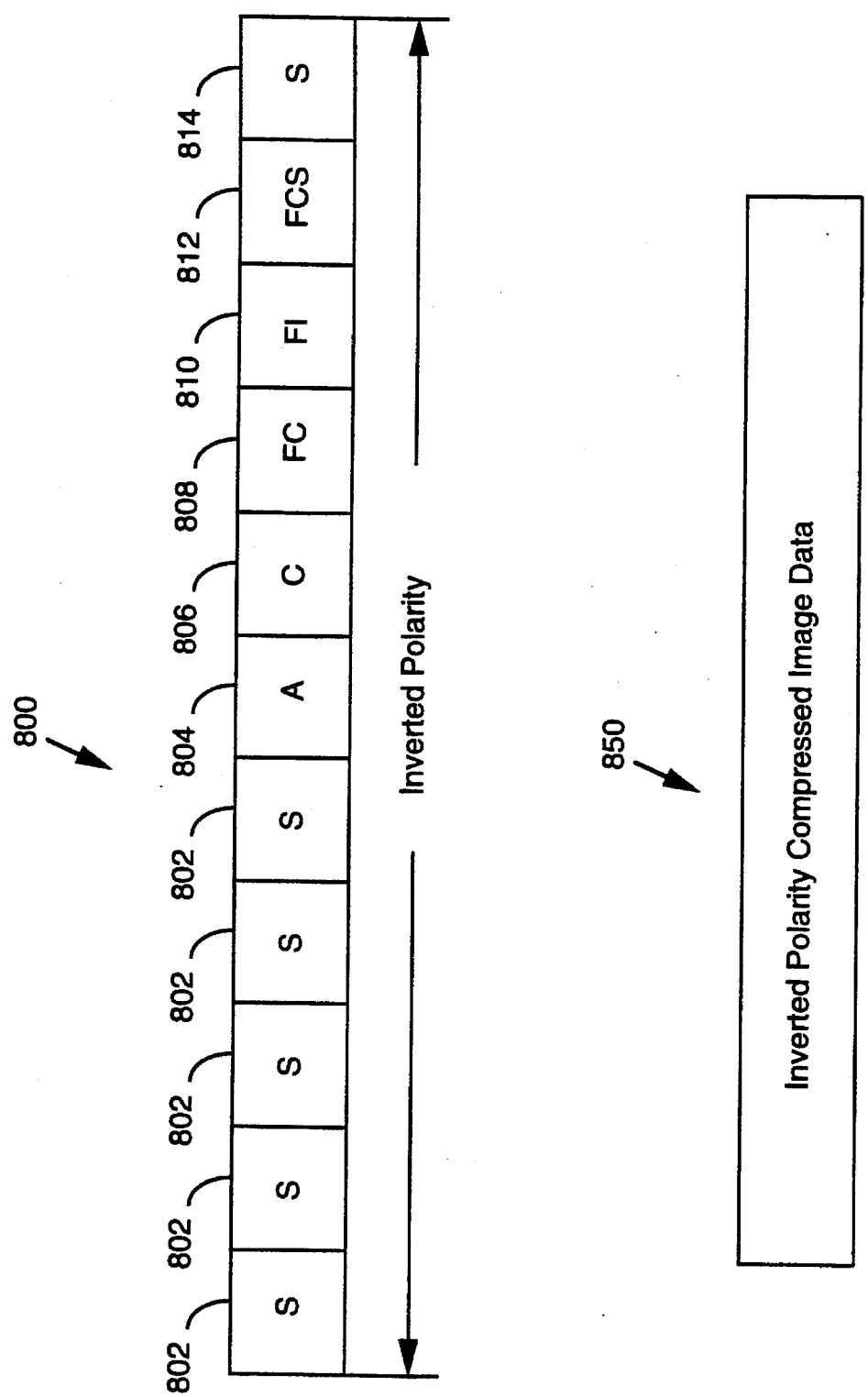
FIG. 3 shows the protocol and data formats associated with the Compatible mode of operation.

FIG. 3 shows the formats associated with the Compatible mode. It employs an inverted High level Data Link Control (HDLC) format 800 comprising a sequence of symbols 802–814. Furthermore, it employs an inverted compressed data format 850 for the image on a page being transmitted.

The symbols 802–814 of the Compatible mode respectively provide the same functions as do the symbols 702–714 of the G3 mode. But, their polarity is inverted (i.e. they have negative polarity) with respect to the symbols 702–714.

Furthermore, in the preferred embodiment for the Compatible mode, the symbols 802–814 of the Compatible mode protocol messages are generated so that they are 8 bit bytes. However, once a Compatible mode protocol message is generated, zero bits are not insertion into the symbols 802–814 of the protocol message. Thus, each of the symbols 802–814 will have 8 bits of information.

Like the data format 750 of the G3 mode, the data format 850 of the Compatible mode also comprises compressed data representing the image on the page being transmitted. However, in this case, the polarity of the compressed data bits are inverted (i.e. have negative polarity) with respect to those in the G3 mode.

As was indicated earlier, the ECM mode can be used in conjunction with either the G3 mode or the Compatible mode for transmitting or receiving the image data with the FAX machine 200. The protocol messages of the selected G3 or Compatible mode is used to initialize the FAX machine 200 for subsequent transmittal or reception of the image data in the ECM mode.

Figure 4:
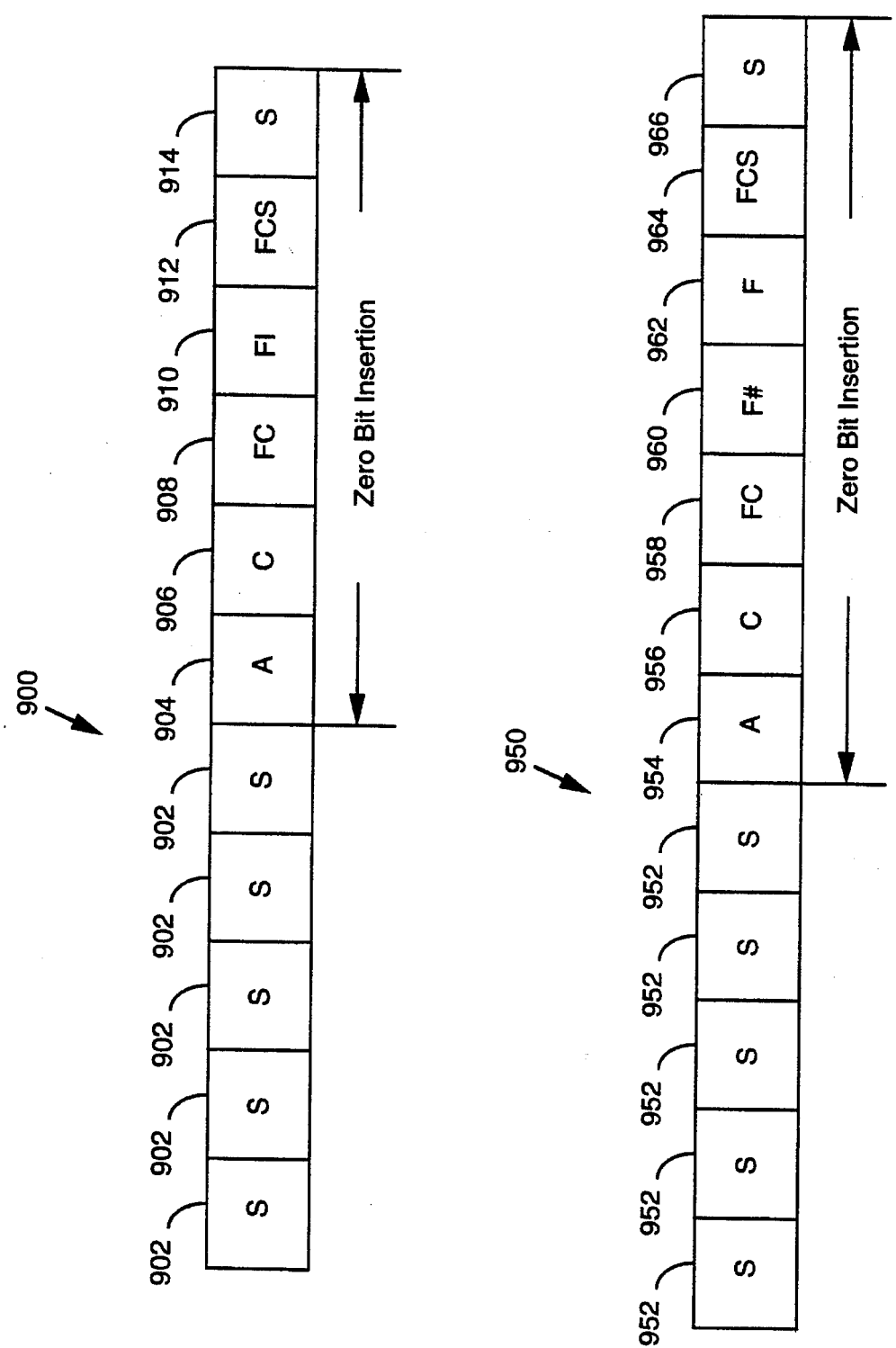
FIG. 4 shows the protocol and data formats associated with the ECM mode of operation.

FIG. 4 shows the format associated with the ECM mode. In the ECM mode, the image data is organized into data frames. The data frames are sequentially transmitted and received. In order that this may be accomplished, the ECM mode employs an HDLC protocol format 900 comprising the sequence of symbols 902–914 and an HDLC data format 950 comprising the sequence of symbols 952–966.

The symbols 902–914 of the ECM mode protocol format 900 respectively provide functions similar to those of the symbols 702–714 of the G3 mode. And, as is the case in the G3 mode, the polarity of the bits of the symbols 902–914 associated with the ECM mode is positive. However, in this case, the symbols 902–914 are used for communication by the FAX machines 200 and 300 for the actual transmission and reception of the image data. This communication occurs after the reception of each data frame rather than in the initial handshaking process described earlier for the G3 mode.

Furthermore, in preferred embodiment, each of the symbols 902–914 of an ECM mode protocol message is generated as an 8 bit byte. Once an ECM mode protocol message is generated, zero bits are inserted into the symbols 904–914. This is done in order to distinguish between the synchronization symbols 902 and the other symbols 904–914 which make up the protocol message. The bits used to represent the symbols 902–914 have positive polarity.

The symbols 952–958, 964 and 966 of the data format 950 respectively provide functions similar to those of the symbols 702–708, 712, and 714 of the G3 mode. However, in this case, the symbols 952–958, 964, and 966 are used in the transmittal of each data frame by whichever of the FAX machines 200 or 300 is transmitting the image data.

The frame number (F#) symbol 960 simply represents which frame is being transmitted. In the preferred embodiment, the data representing the image on a page is comprised of 256 frames. Thus, for each page, the frame number symbol indicates which one of the 256 frames is being transmitted.

The data frame (F) symbols 962 represent the data symbols which make up each data frame. In the preferred embodiment, each data frame comprises 256 symbols.

Furthermore, in preferred embodiment, each of the symbols 952–966 of an ECM mode data message is generated as an 8 bit byte. Once an ECM mode data message is generated, zero bits are inserted into the symbols 954–966. This is done in order to distinguish between the synchronization symbols 952 and the other symbols 954–966 which make up the data message. The bits used to represent the symbols 952–966 have positive polarity.

Transmitting Image Data

Figure 5A:
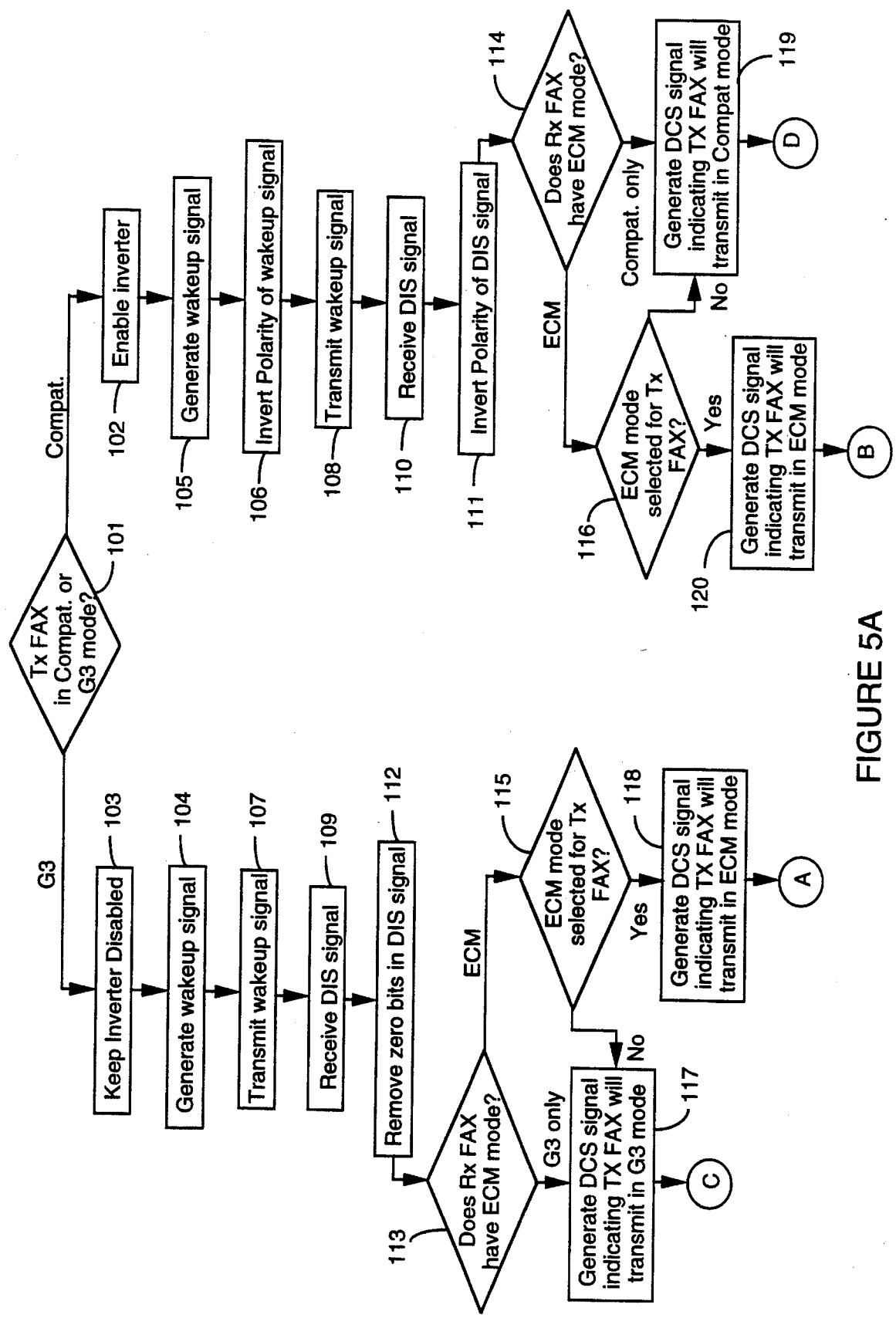
FIGS. 5A–5C shows a method for transmitting image data in accordance with the invention.
Figure 5B:
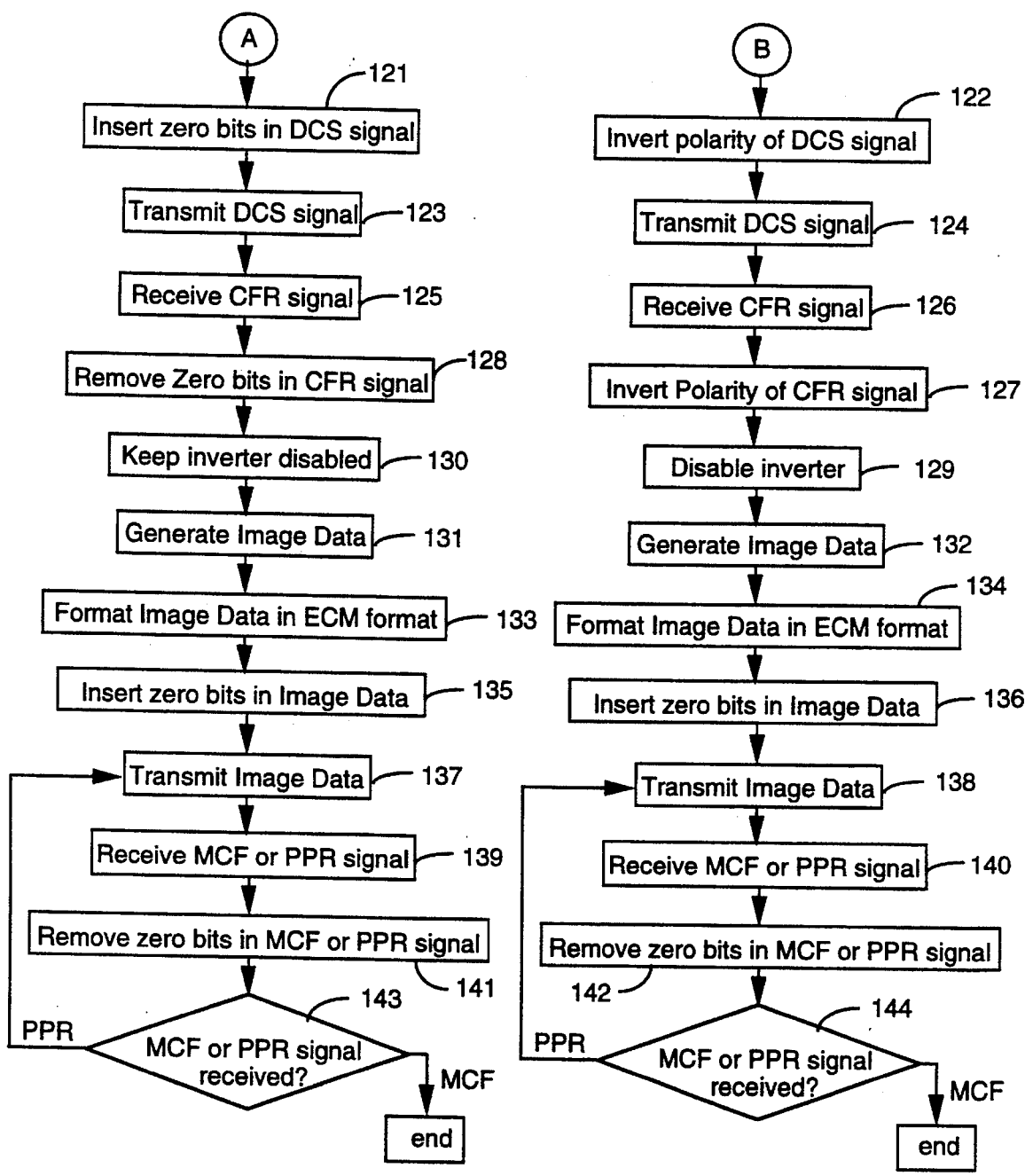
Figure 5C:
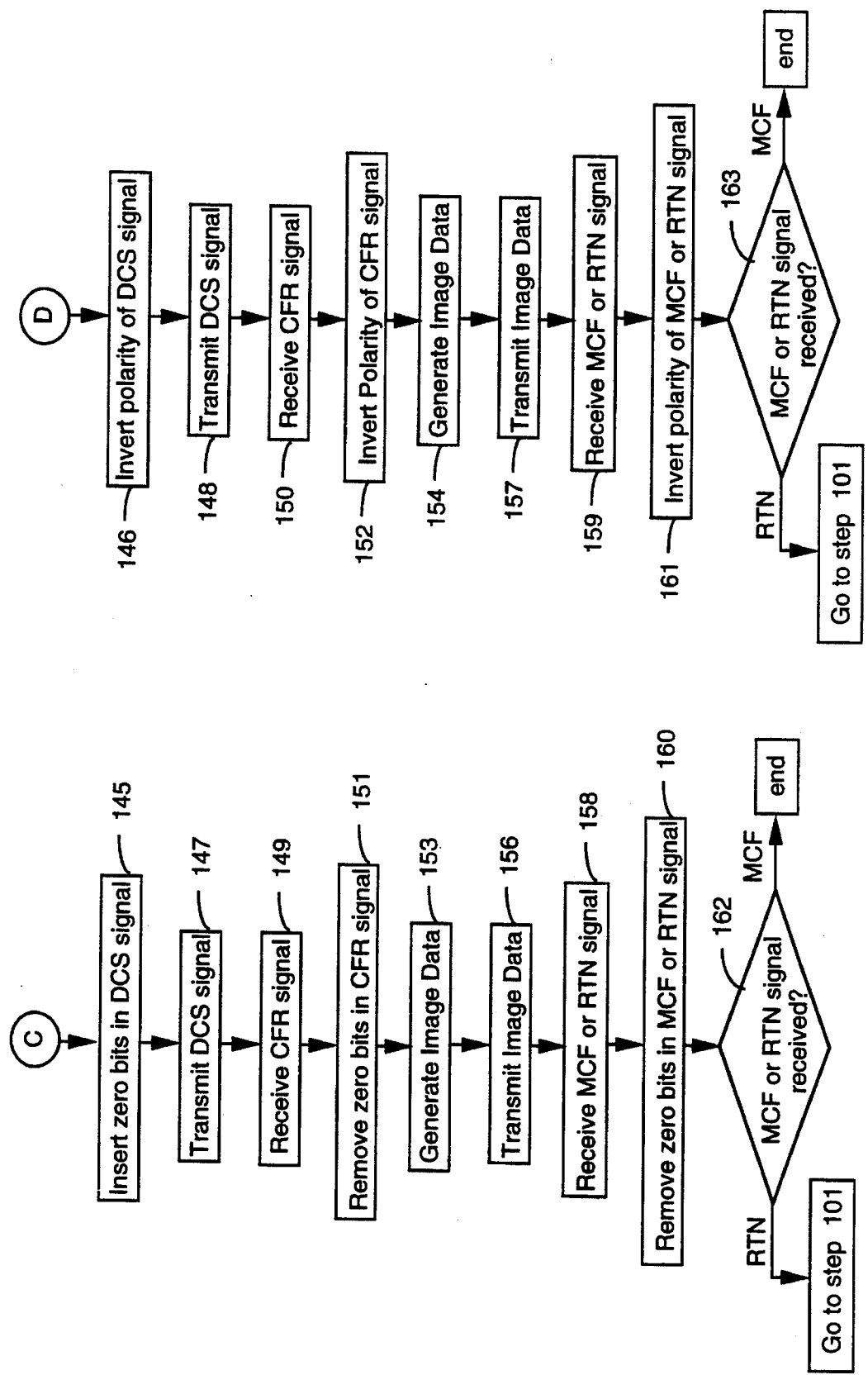
Figure 6:
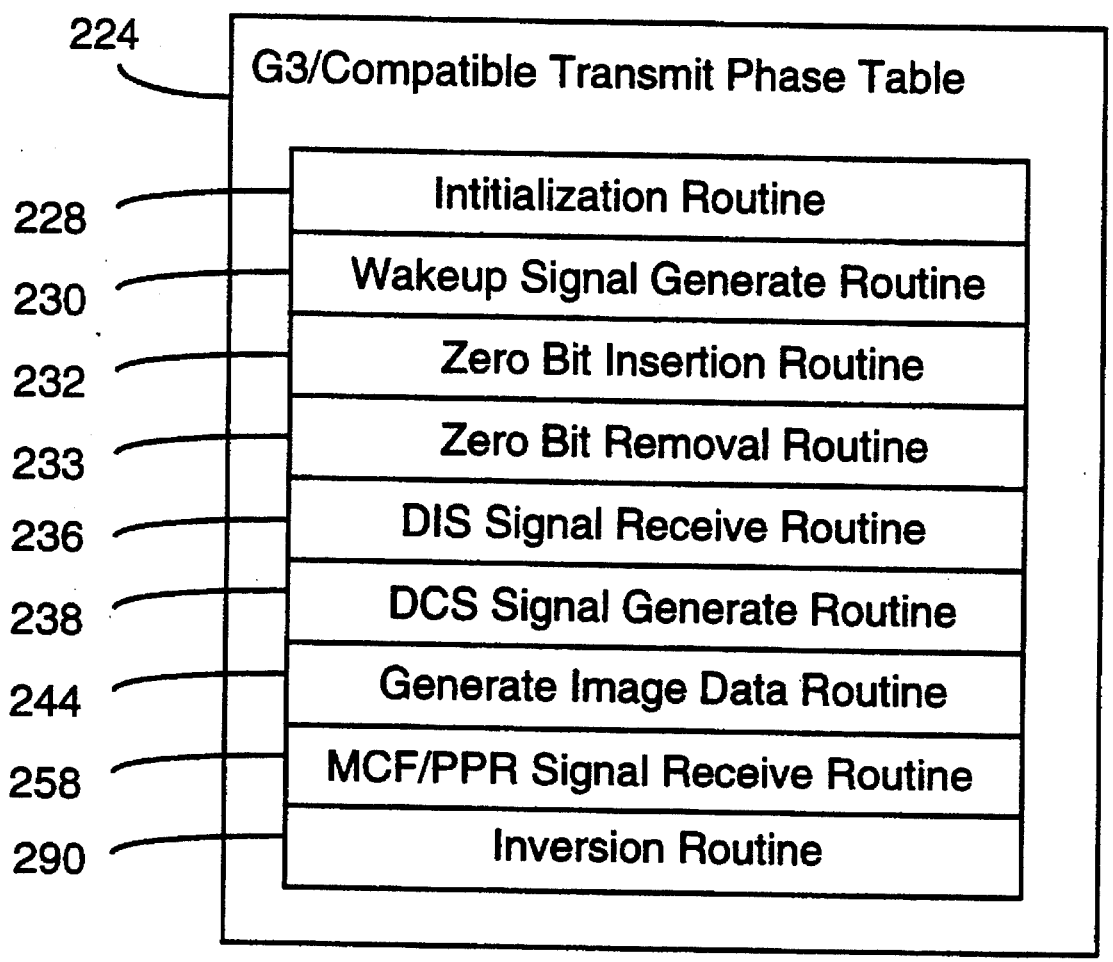
FIG. 6 shows a transmit phase table utilized for both the G3 and the Compatible modes.
Figure 7:
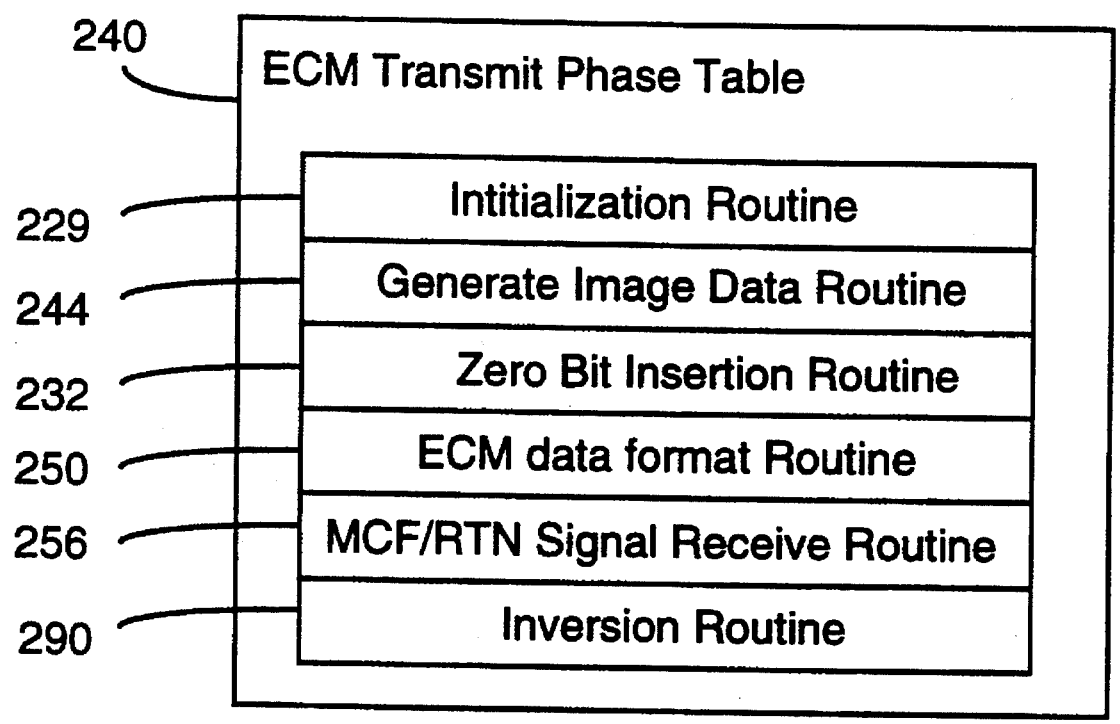
FIG. 7 shows a transmit phase table utilized in the ECM mode in conjunction with either the G3 or the Compatible mode.

FIGS. 5A, 5B, and 5C in conjunction with FIGS. 1, 6, and 7 shows a method for transmitting image data with FAX machine 200. In this method, either the G3 or Compatible mode can be selected along with the ECM mode for transmittal of the image data to the FAX machine 300.

As shown in FIG. 5A, the first step 101 is to determine whether a user of the transmitting (Tx) FAX machine 200 has selected either the G3 or the Compatible mode of operation. Referring to FIG. 1, the user makes this selection with the user interface 202. In response to selection of either of these modes, the interface 202 generates a signal indicating which mode was selected.

The mode indication signal is received by the CPU 204 of facsimile control unit (FCU) 206. The CPU 204 runs the operating system 208 which is stored in the memory 210 of the FCU 206. The operating system 208 sends the mode indication signal to the communication interface (CI) 212. The communication interface 212 then sends the signal to the CPU 214 of the digital interface controller (DIC) 216.

The CPU 214 runs the monitor 218 which is stored in the memory 220 of the DIC 216. The monitor 218 oversees the operation of the entire DIC 216. Also running on the CPU 214 is the phase execution handler routine 222. In response to the mode indication signal, the monitor 218 then determines which mode was selected. Referring to FIGS. 1 and 6, the monitor then provides this information to the phase execution handler 222 and instructs the phase execution handler to start executing the G3 /Compatible mode transmit phase table 224. Thus, one phase table 224 is used for both the G3 and the Compatible modes. The phase routines of the G3/Compatible transmit phase table 224 are shown in FIG. 6.

If it is determined in step 101 that the Compatible mode was selected, then the next step 102, shown in FIG. 5A, is to enable the inverter 226 in the DIC 216. But, if it is determined in step 102 that the G3 mode was selected, then inverter 226 is kept disabled in step 103.

Turning back to FIGS. 1 and 6, after each transmission or reception of image data by FAX machine 200, the inverter 226 is disabled. This is accomplished when the phase execution handler 222 executes the initialization routine 228 after each transaction and generates a disable signal for disabling the inverter 226.

In order to accomplish steps 102 and 103, the phase execution handler 222 executes the initialization routine 228 of the phase table 224. If the Compatible mode has been selected, the initialization routine 228 generates an enable signal for enabling the inverter 226. If the G3 mode has been selected, the initialization routine 228 maintains a disable signal for keeping the inverter 226 disabled. The enable and disable signals are sent from the CPU 214 to the inverter 226.

As shown in FIG. 5A, the next steps 104 and 105 of the G3 and Compatible modes respectively are to generate a wakeup protocol signal. This signal is used to wake up the receiving (Rx) FAX machine 300.

Referring back to FIGS. 1 and 6, in order to accomplish step 106, the phase execution handler 222 executes the wakeup signal generating routine 230. It generates the wakeup protocol signal in accordance with the G3 protocol format 700 even if step 102 determines that the Compatible mode was selected.

In either mode, the wakeup protocol signal is sent from the CPU 214 to the serial communication chip (SCC) 234. The SCC 234 formats the wakeup protocol signal in the RS-232 format and outputs the formatted signal to the inverter 226.

If the Compatible mode is being used, then in step 106 the polarity of the wakeup protocol signal is inverted. After the inversion has taken place, the wakeup protocol signal will be formatted in the Compatible mode protocol format 800 described earlier. However, if it is determined in step 102 that the G3 mode was selected, then the polarity of the wakeup protocol signal is not inverted and the signal will remain in the G3 protocol format 700. Referring to FIG. 1, this inversion step is accomplished by the inverter 226 when it has been enabled in step 102. Otherwise, the inverter 226 has been kept disabled in step 103 and does not perform an inversion. In either mode, the wakeup signal is sent to the modem 400 from the inverter 226.

The next steps 107 and 108 shown in FIG. 5A for the two modes, is to transmit the wakeup protocol signal to the Rx FAX machine 300. Referring back to FIG. 1, the wakeup protocol signal is transmitted to the FAX machine 300 by the modem 400.

Referring back to FIG. 5A, the next steps 109 and 110 for the G3 and Compatible modes respectively, are for the Tx FAX machine 200 to receive a digital information (DIS) protocol signal from the Rx FAX machine 300. The DIS protocol signal contains information indicating whether or not Rx FAX machine 300 has an ECM mode. Turning back to FIG. 1, this receiving function is accomplished by modem 400. The DIS signal is then sent to the inverter 226 in RS-232 format by the modem 400.

If the Compatible mode is being used, then the next step 111, shown in FIG. 5A, is to invert the polarity of the received DIS protocol signal. After the inversion, the DIS signal will be formatted in accordance with the G3 mode protocol format 700. However, if the G3 mode is being used, then no inversion takes place and the signal will remain in the G3 mode protocol format 700.

Referring back to FIGS. 1 and 6, step 111 is accomplished by the inverter 226 when it has been enabled in step 102. But, if the inverter 226 was kept disabled in step 103, no inversion takes place. In either case, the DIS signal is then sent to the SCC 234 where it is deformatted from the RS-232 format. From there, the DIS signal is sent to the CPU 214.

As shown in FIG. 5A, if the G3 mode is being used for protocol communications, the next step 112 is to remove the zero bits inserted in the symbols 704–714 of the DIS signal. After the zero bit removal, the DIS signal will still be formatted in accordance with the G3 mode protocol format 700. However, if the Compatible mode is being used, then no zero bit removal takes place. Referring to FIG. 1, in order to accomplish step 112, the phase execution handler executes the zero bit removal routine 233.

Referring again to FIG. 5A, the next steps 113 and 144 for the two modes, shown in FIG. 5A, are to determine from the DIS signal whether the Rx FAX machine 300 has an ECM mode. Turning back to FIGS. 1 and 6, in order to accomplished step 118, the phase execution handler 222 executes the DIS signal receive routine 236. The routine 236 determines from the DIS signal formatted in the protocol format 700 whether FAX machine 300 has an ECM mode.

Returning to FIG. 5A, if it is determined in steps 113 and 114 that Rx FAX machine 300 has an ECM mode, the next steps 115 and 116 respectively for the G3 and Compatible modes are to determine if the ECM mode was selected for the FAX machine 200. Referring back to FIG. 1, steps 115 and 116 are accomplished by determining if the user has selected the ECM mode with the user interface 202. In response to selection of this mode, the interface 202 generates a signal indicating that the ECM mode was selected. The ECM mode selection signal is received by the CPU 204 of facsimile control unit (FCU) 206. The operating system 208 sends the ECM mode selection signal to the communication interface (CI) 212. The communication interface 212 then sends the signal to the CPU 214. The monitor 218 determines from the ECM mode selection signal whether the ECM mode was selected and provide this information to the phase execution handler 222.

Figure 8A:
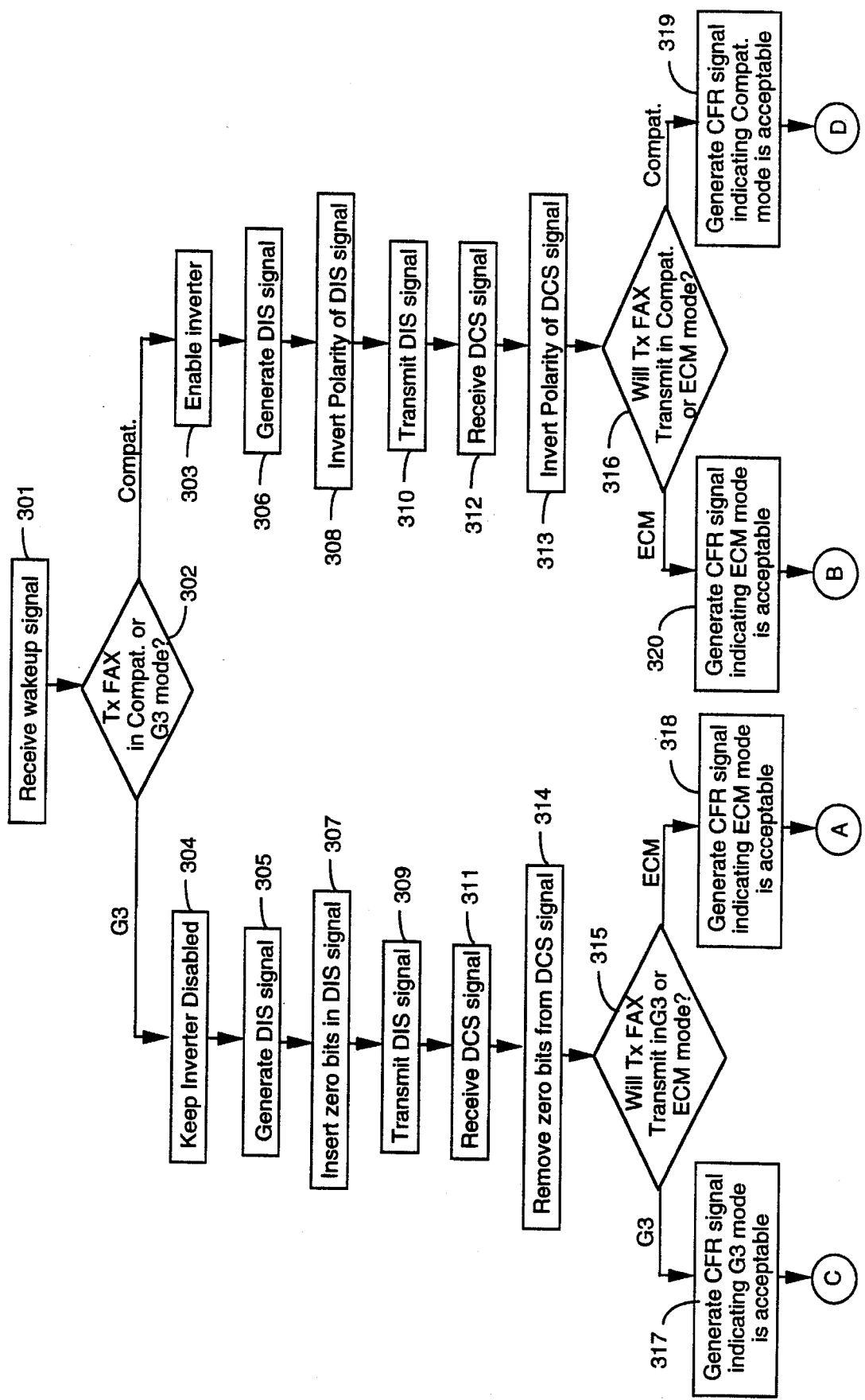
FIGS. 8A–8D shows a method for receiving image data in accordance with the invention.

In steps 117–120, shown in FIG. 8A, Tx FAX machine 200 generates a digital command (DCS) protocol signal which indicates in which data format Tx FAX machine 200 will transmit the image data. Referring back to FIGS. 1 and 6, steps 117–120 are accomplished when the phase execution handler executes the DCS signal generating routine 270.

In G3 mode protocol communications, the DCS signal will indicate that the Tx FAX machine 200 will transmit the image data in the G3 mode data format 750 if in step 113 the received DIS signal indicates that Rx FAX machine 300 only has the G3 mode. This is shown in step 117. But, the DCS signal will indicate that the Tx FAX machine 200 will transmit the image data in the ECM mode data format 950 if in step 113 the received DIS signal indicates that Rx FAX machine 300 has the ECM mode and if in step 115 it is determined that the ECM mode has been selected for the TX FAX machine 200. This shown in step 118.

For Compatible mode protocol communications, the DCS signal will indicate that the Tx FAX machine 200 will transmit the image data in the Compatible mode data format 850 if in step 114 the received DIS signal indicates that Rx FAX machine 300 only has the Compatible mode. This is shown in step 119. But, the DCS signal will indicate that the Tx FAX machine 200 will transmit the image data in the ECM mode data format 950 if in step 114 the received DIS signal indicates that Rx FAX machine 300 has the ECM mode and if in step 116 it is determined that the ECM mode has been selected for Tx FAX machine 200. This is shown in step 120.

FIG. 5B shows the steps for both cases when the image data will be transmitted in the ECM mode data format 950. If the G3 mode is being used, the next step 121, shown in FIG. 5B, is to insert zeroes in the symbols 704–714 of the DCS signal. However, if the Compatible mode is being used for the protocol communications, then no zero bit insertion is done. Returning to FIG. 1, the zero bit insertion is accomplished when execution handler 222 executes the zero insertion routine 232.

In either mode, the DCS signal is sent from the CPU 214 to the serial communication chip (SCC) 234. The SCC 234 formats the wakeup protocol signal in the RS-232 format and outputs the formatted signal to the inverter 226.

If the Compatible mode is being used for protocol communications, then the next step 121, shown in FIG. 5B, is to invert the DCS signal. After the inversion, the DCS signal will be formatted in accordance with the G3 mode protocol format 700. However, if the G3 mode is being used, then no inversion takes place and the signal will remain in the G3 mode protocol format 700.

Referring back to FIGS. 1 and 6, step 121 is accomplished by the inverter 226 when it has been enabled in step 102. But, if the inverter 226 was kept disabled in step 103, no inversion takes place. In either case, the DCS signal is then sent to the SCC 234 where it is deformatted from the RS-232 format. From there, the DCS signal is sent to the CPU 214.

The next steps 123 and 124, shown in FIG. 5B, respectively for the G3 and Compatible mode are to transmit the DCS signal from the Tx FAX machine to the Rx FAX machine. Referring to FIG. 1, this is done by the modem 400.

As shown in FIG. 5B, in the following steps 125 and 126, the Tx FAX machine 200 receives a confirm to receive (CFR) protocol signal from the receiving FAX machine 300. The CFR protocol signal contains information indicating that Rx FAX machine 300 will receive the image data formatted in accordance with the mode indicated in the DCS signal. The CFR signal is received by modem 400 and sent to the inverter 226.

In the Compatible mode, the next step 127, shown in FIG. 5B, is to invert the polarity of the received CFR protocol signal. After the inversion, the CFR signal will be formatted in accordance with the G3 mode protocol format 700. However, if the G3 mode is being used, then no inversion takes place and the signal will remain in the G3 mode protocol format 700 with zero bit insertion. Step 127 is accomplished if the inverter 226 was enabled in step 102. Otherwise, no inversion takes place.

From the inverter 226, the CFR signal is sent to the SCC 234 where it is deformatted from its RS-232 format. From the SCC 234 the CFR signal is sent to the CPU 214.

In the G3 mode, as shown in FIG. 5B, the next step 128 is to remove the zero bits inserted in the symbols 704–714 of the CFR signal. After the zero bit removal, the CFR signal will still be formatted in accordance with the G3 mode protocol format 700. However, in the Compatible mode, no zero bit removal takes place. The zero bit removal is accomplished when the phase execution handler 222 executes the zero bit removal routine 233.

If the Compatible mode had been used for protocol communications, then the next step 129, shown in FIG. 5B, is to disable the inverter 226. And, if the G3 mode was being used for these communications, then the next step 130 is to keep the inverter 226 disabled.

This is accomplished when the FAX machine 200 determines from the CFR signal that FAX machine 300 will accept the image data formatted in accordance with the mode indicated in the DCS signal. Turning back to FIGS. 1 and 6, the phase execution handler 222 executes the CFR signal receive routine 238 when the CFR signal is received. The signal receive routine 238 indicates to the monitor 218 in that the image data will be transmitted to the FAX machine 300 in the ECM data format 950. In response, the monitor 218 instructs the phase execution handler 222 to begin executing the ECM mode transmit phase table 240 shown in FIG. 7. Thus, Rx FAX machine 300 can switch to the ECM mode from either the G3 mode or the Compatible mode.

The phase execution handler 222 first executes the initialization routine 229. In the case where the inverter 226 has been enabled in step 102 (i.e. the Compatible mode was being used for protocol communications), the inverter will be disabled by a disable signal generated by the routine 229. In the case where the inverter 226 had been kept disabled in step 103 (i.e. the G3 mode was being used for protocol communications), the inverter 226 will be kept disabled by a disable signal generated by the routine 229. In either case, the disable signal is sent from the CPU 214 to the inverter 226.

As shown in FIG. 5B, the next steps 131 and 132 in both situations where the ECM mode is used is to generate the image data. Referring to FIGS. 1 and 7, in order to accomplish this step, the phase execution handler 222 executes the generate image data routine 244. The routine 244 generates a scan signal for instructing the CPU 204 to instruct the scanner/printer 246 to scan the image on a page of a document. The scanner/printer 246 scans the page and produces the image data which represents the image on the page.

The image data is provided from the printer/scanner 246 to the data compressor/decompressor (DCR) 248. The DCR 248 compresses the data using conventional data compression techniques. After the data compression, the image data is formatted in accordance with the G3 mode data format 750. The compressed image data is then sent to the CI 212 and from there to the CPU 214 of the DIC 216.

Referring back to FIG. 5A, the next steps 133 and 134 for either situation where the ECM mode is being used is to format the compressed image data in the ECM mode data format 950. Referring back to FIGS. 1 and 7, in order to accomplish steps 133 and 134, the phase execution handler 222 executes the ECM mode data format routine 250. In accordance with the ECM mode data format 950 described earlier, the routine 250 formats the compressed image data associated with a page of a document into a sequence of data blocks. The data blocks are organized into a sequence of data frames.

Referring again to FIG. 5B, the next steps 135 and 136 are to insert zero bits in the symbols 954–966 of each data frame. Turning back to FIGS. 1 and 7, in order to accomplish the zero bit insertion, the phase execution handler 222 executes the zero bit insertion routine 232.

Each ECM mode formatted data frame is then sent from the CPU 214 to the serial communication chip (SCC) 234. The SCC 234 formats each data frame in the RS-232 format and outputs the formatted data frame to the inverter 226.

The next steps 137 and 138, shown in FIG. 5B, for the two situations where the ECM mode is being used are to transmit the image data to Rx FAX machine 300. Referring to FIG. 1, the image data is transmitted with modem 400.

As shown in FIG. 5B, the next steps 139 and 140 are for the Tx FAX machine 200 to receive either a message confirm (MCF) signal or a partial page received (PPR) signal from the Rx FAX machine 300. The MCF and PPR signals are received in the ECM mode protocol format 900 with zero bit insertion. The MCF signal contains information indicating that the Rx FAX machine 300 has properly received the data frames transmitted by the Tx FAX machine 200. On the other hand, the PPR signal indicates which data frames were not properly received by the Rx FAX machine 200. Returning to FIG. 1, the MCF and PPR signals are received by modem 400 and sent to the inverter 226.

Since the inverter has been disabled in steps 129 and 130 for the ECM mode, the received MCF or PPR signal is not inverted. From the inverter 226, the signal is sent to the SCC 234 where it is deformatted from its RS-232 format. From the SCC 234 the signal is sent to the CPU 214.

Referring back to FIG. 5B, the next steps 141 and 142 are to remove the zero bits inserted in the symbols 904–914 of the MCF or PPR signal. Referring to FIGS. 1 and 7, the zero bit removal occurs when the phase execution handler executes 222 the zero bit removal routine 233.

In steps 143 and 144, shown in FIG. 5C, the Tx FAX machine 200 determines whether the MCF or the PPR signal has been received. Returning to FIG. 7, to make this determination, the phase execution handler 222 executes the MCF/PPR signal receive routine 256.

If the routine 256 determines that the MCF signal was received (i.e. that the image data was properly received), then transmission of the image data for the page ends in both situations where the ECM mode is being used. However, if the PPR signal was determined to have been received, then for the two situations the method returns to the corresponding transmission steps 137 and 138. The improperly received data frames are then retransmitted by the Tx FAX machine 200 in the steps 137 and 138. The steps 139, 141, and 143 are then performed again for when the Tx FAX machine 200 has switched from the G3 mode to the ECM mode and the steps 140, 142, and 144 are performed again for when the Tx FAX machine 200 has switched from the Compatible mode to the ECM mode.

FIG. 5C shows the steps for when the image data will be transmitted in the G3 or Compatible mode data formats 750 and 850 respectively. In the Compatible mode, the inversion step 146, the transmission step 148, the signal reception step 150, and the inversion step 152 are respectively done in the same way as in steps 122,124,126, and 127 described earlier. In the G3 mode, the zero bit insertion step 145, the transmission step 147, the signal reception step 149, and the zero bit removal step 151 are respectively done in the same way as in steps 121,123,125, and 128 described earlier.

When Tx FAX machine 200 will transmit the image data in the G3 or Compatible modes, the monitor 218 will continue to point the phase execution handler 222 to the G3 /Compatible mode receive phase table 260. Thus, if the inverter 226 was earlier enabled in step 102, it will remain enabled. Similarly, if the inverter 226 was earlier disabled in step 103, it will remain disabled. In other words, the Tx FAX machine 200 continues to use the G3 or Compatible mode for transmission of the image data.

Referring to FIGS. 5B and 5C, in the G3 mode, the image data generating step 153 is done in the same as in step 131 described earlier. For the Compatible mode, the image data generating step 154 is done in the same as step 132 described earlier.

Referring to FIG. 1, in both the G3 and the Compatible modes, after the generated image data is compressed by the DCR 248, it is sent to the CPU 204 of the FCU 206. From there, it is provided to the CPU 214 of the DIC 216. However, unlike in the ECM mode, the image data is then sent directly to the SCC 234 where it is formatted in the RS-232 format. The SCC 234 then sends the image data to the inverter 226.

In the Compatible mode, the next step 155, shown in FIG. 5C, is to invert the polarity of the image data. Referring to FIG. 1, this is accomplished by the inverter 226 because it has been enabled in step 102. From the inverter 226, the image data is sent to the modem 400.

Referring to FIGS. 5B and 5C, in the G3 mode, the transmission of the image data in the next step 156 is done in the same way as in step 137 described earlier. In the Compatible mode, the transmission of the image data in the next step 157 is done in the same way as in step 138 described earlier.

As shown in FIG. 5C, the next steps 158 and 159 for the G3 and Compatible modes respectively are for the Tx FAX machine 200 to receive either an MCF signal or a return negative (RTN) signal from the Rx FAX machine 300. As was indicated earlier, the MCF signal contains information indicating that the Rx FAX machine 300 has properly received the data frames transmitted by the Tx FAX machine 200. On the other hand, the RTN signal indicates that the image data was not properly received by the Rx FAX machine 200. Returning to FIG. 1, the MCF and RTN signals are received by modem 400 and sent to the inverter 226.

In the Compatible mode, the next step 161, shown in FIG. 5C, is to invert the polarity of the received MCF or RTN protocol signal. After the inversion, this signal will be formatted in accordance with the G3 mode protocol format 700. However, if the G3 mode is being used, then no inversion takes place and the signal will remain in the G3 mode protocol format 700 with zero bit insertion. Step 161 is accomplished if the inverter 226 was enabled in step 102. Otherwise, no inversion takes place.

From the inverter 226, the signal is sent to the SCC 234 where it is deformatted from its RS-232 format. From the SCC 234 the signal is sent to the CPU 214.

Referring back to FIG. 5B, in the G3 mode, the next step 160 is to remove the zero bits inserted in the symbols 704–714 of the MCF or PPR signal. Referring to FIGS. 1 and 6, the zero bit removal occurs when the phase execution handler executes 222 the zero bit removal routine 233.

In steps 162 and 163, shown in FIG. 5C, the Tx FAX machine 200 determines whether the MCF or the RTN signal has been received. Returning to FIG. 6, to make this determination, the phase execution handler 222 executes the MCF/RTN signal receive routine 258.

If the routine 258 determines that the MCF signal was received (i.e. that the image data was properly received), then transmission of the image data for the page ends in both the G3 and the Compatible modes. However, if the RTN signal was determined to have been received, then in order for Rx FAX machine to reproduce the image data, the entire process beginning at step 101 must be repeated.

Receiving Image Data

Figure 8B:
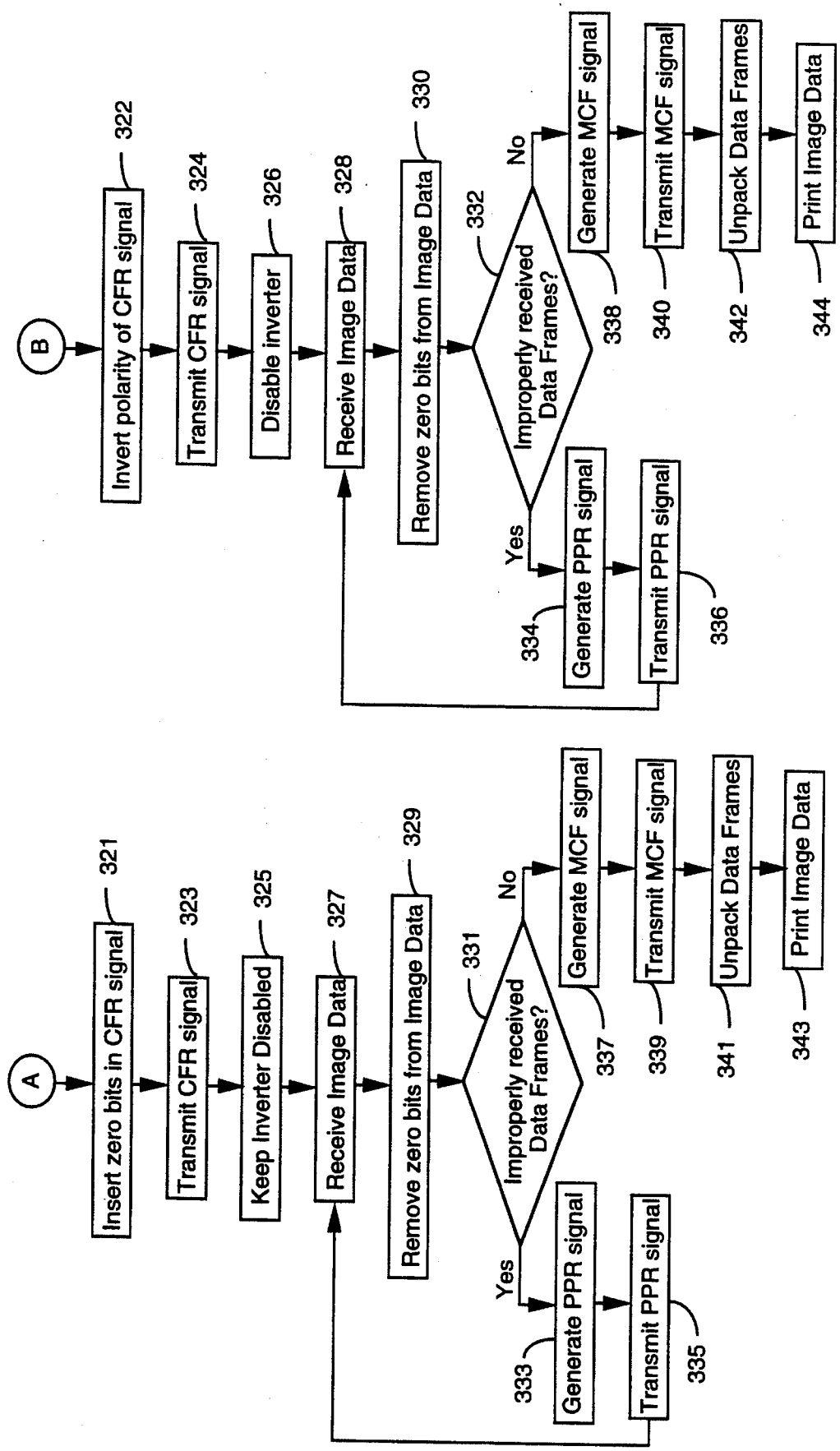
Figure 8C:
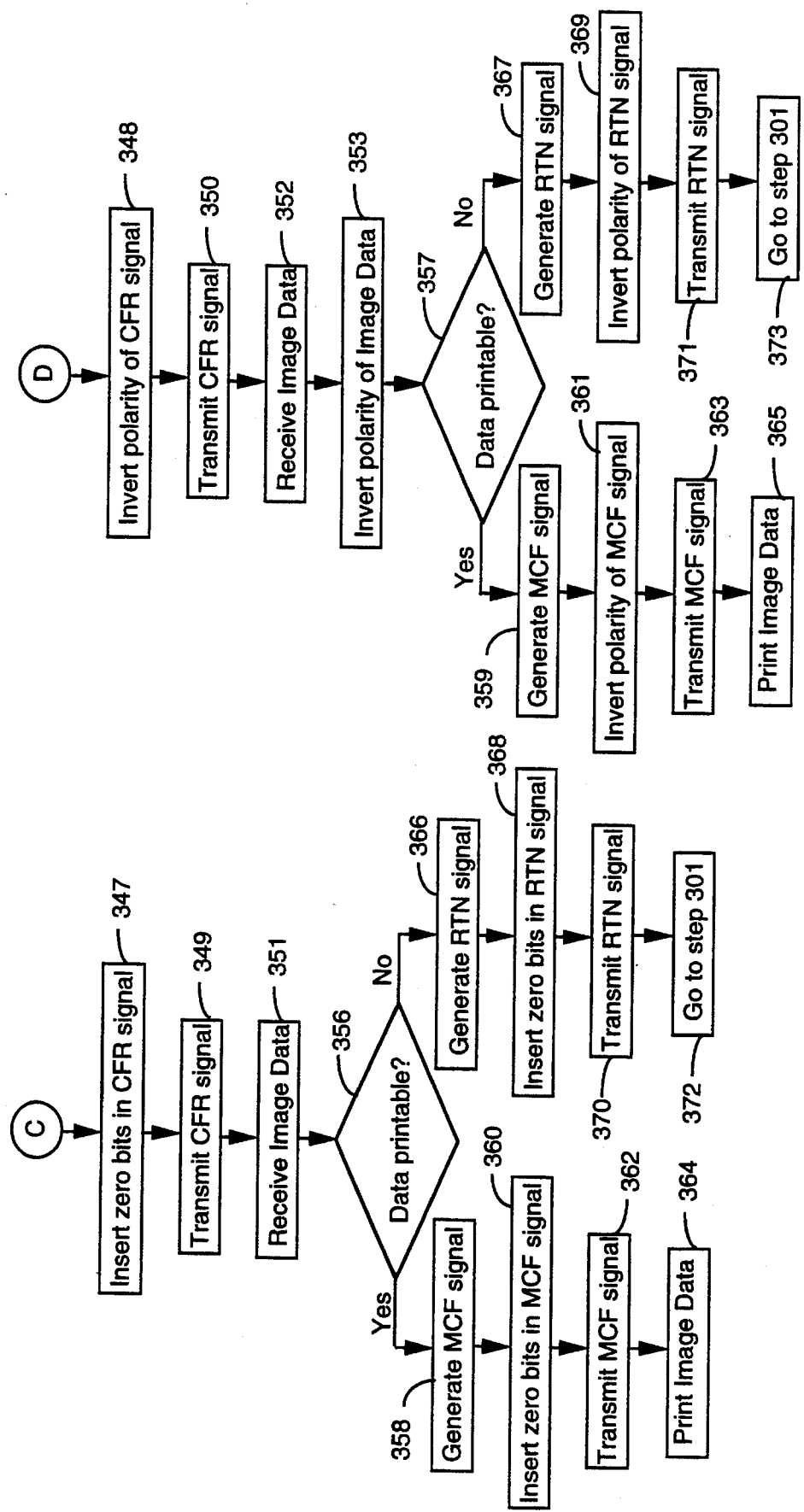
Figure 9:
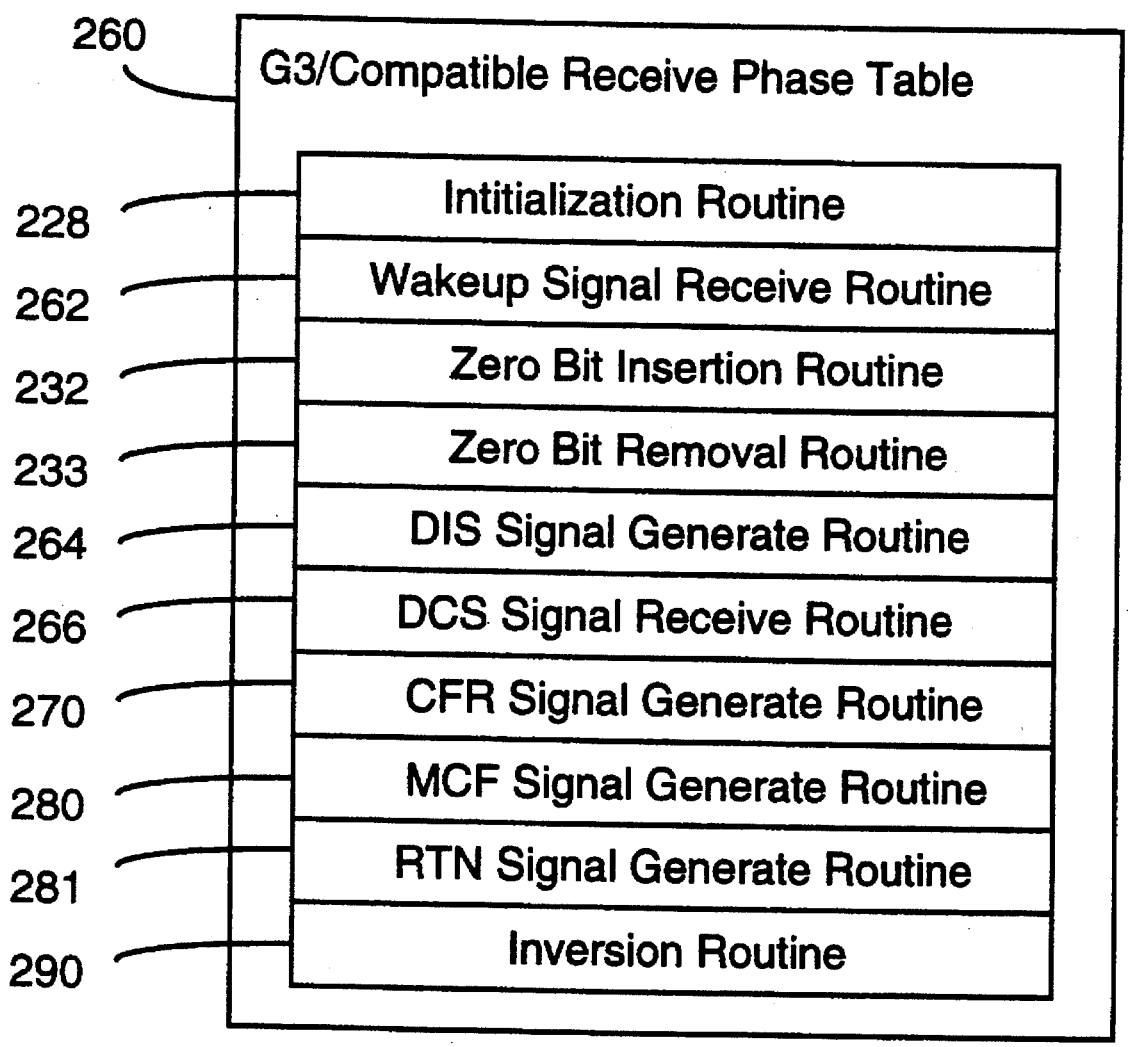
FIG. 9 shows a receive phase table utilized for both the G3 and the Compatible modes.
Figure 10:
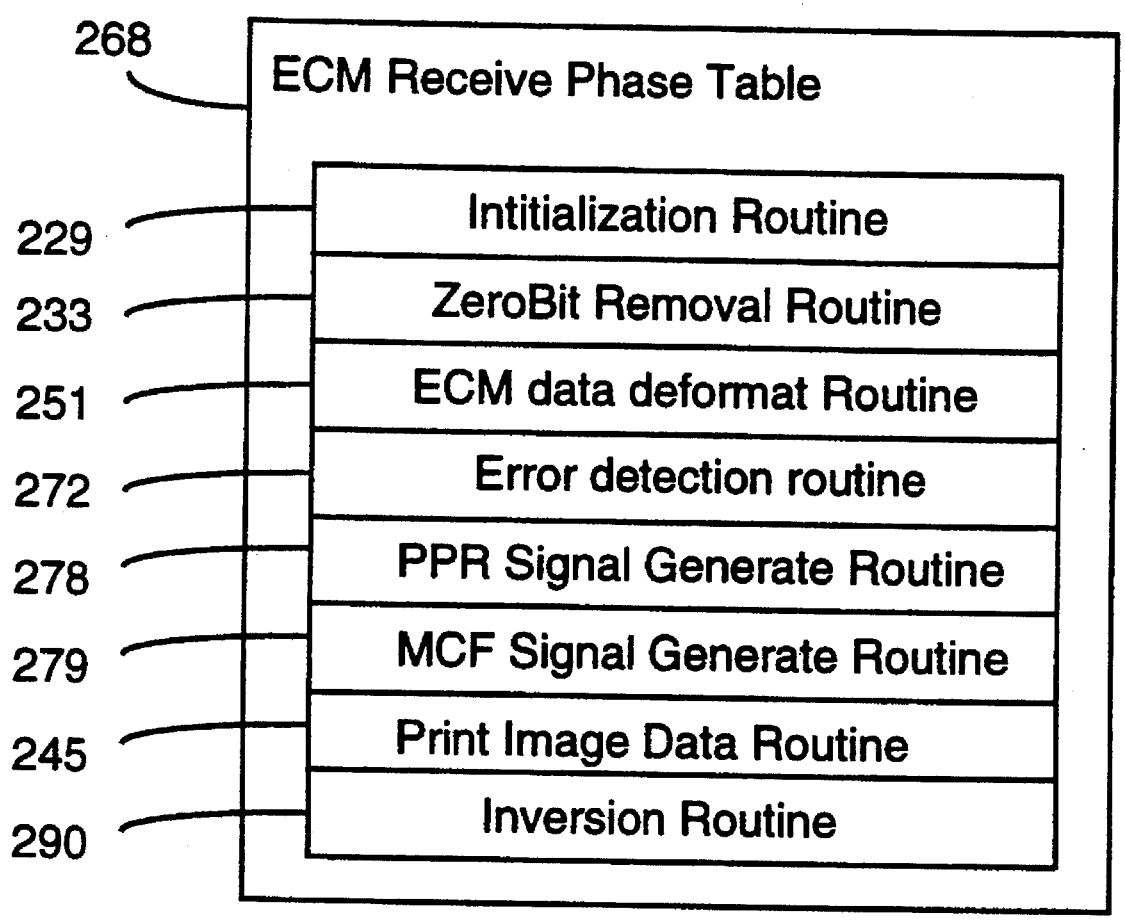
FIG. 10 shows a receive phase table utilized in the ECM mode in conjunction with either the G3 or the Compatible mode.

FIGS. 8A, 8B, and 8C in conjunction with FIGS. 1, 9, and 10 provide a method for receiving image data with the receiving (Rx) FAX machine 200. In this method, either the G3 or Compatible mode can be used along with the ECM mode for receiving the image data from the transmitting (Tx) FAX machine 300.

As shown in FIG. 8A, the first step 301 is to receive a wakeup protocol signal from the Tx FAX machine 300 for waking up the Rx FAX machine 200. Referring to FIG. 1, modem 400 receives the wakeup protocol signal and sends it the inverter 226. However, after each transmission or reception of image data by Rx FAX machine 200, the inverter 226 is disabled. Since the inverter 226 has been disabled since the last transaction, the wakeup protocol signal is not inverted by the inverter 226. From the inverter 226, the wakeup protocol signal is sent on to the SCC 234 where it is deformatted from the RS-232 format it was received in. The SCC 234 then sends the signal to the CPU 214.

As shown in FIG. 8A, the next step 302 is to determine whether the G3 or the Compatible mode of operation is being used for protocol communications by the Tx FAX machine 300. Referring to FIGS. 1 and 9, in order to accomplish this, the monitor 218 calls up the auto-detection routine 261. The auto-detection routine 261 determines from the pattern of the wakeup signal whether Tx FAX machine 300 is using the G3 or the Compatible mode and provides this information to the monitor 218. The monitor 218 then provides this information to the phase execution handler 222 and instructs the phase execution handler 222 to begin executing the routines in the G3 /Compatible mode receive phase table 260.

If it is determined in step 302 that Tx FAX machine 300 is using the Compatible mode, then the next step 303, shown in FIG. 8A, is to enable the inverter 226. Turning back to FIGS. 1 and 9, the phase execution handler accomplishes this by executing the initialization routine 228. The initialization routine 228 generates an enable signal for enabling the inverter 226 which is sent from the CPU 214 to the inverter 226.

However, if the G3 mode is being used by Tx FAX machine 300, then the next step 304 in FIG. 8A is to keep the inverter 226 disabled. Referring back to FIGS. 1 and 9, in this case, the phase execution handler executes the initialization routine 228 which generates a disable signal for disabling the inverter 226. The disable signal is sent from the CPU 214 to the inverter 226.

As shown in FIG. 8A, the next steps in the G3 and the Compatible modes are steps 305 and 306 respectively. As indicated, steps 305 and 306 are for Rx FAX machine 200 to generate a DIS protocol signal in response to receiving the wakeup protocol signal from the Tx FAX machine 300. The DIS protocol signal will be generated by Rx FAX machine 200 in the G3 mode protocol format 700 and will indicate the highest mode capability that Rx FAX machine 200 has for receiving the image data. Thus, since Rx FAX machine 200 has the ECM mode, it will indicate that it has this mode in the DIS signal. Referring back to FIGS. 1 and 9, in order to accomplish step 308, the phase execution handler 222 executes the DIS signal generating routine 264.

If the G3 mode is being used, then the next step 307, shown in FIG. 8A, is to insert zeroes in the symbols 704–714 of the DIS signal generated in step 306. However, if the Compatible mode is being used, no zero bit insertion takes place. Turning back to FIGS. 1 and 9, in order to accomplish the zero bit insertion, the phase execution handler 222 executes the zero bit insertion routine 232.

In either mode, the DIS signal is then sent from the CPU 214 to the SCC 234 where it is formatted in the RS-232 format. From the SCC 234, it is sent to the inverter 226.

As shown in FIG. 8A, if the Compatible mode is being used by the FAX machines 200 and 300, then the next step 308 is to invert the polarity of the DIS signal generated in step 306. After the inversion, the DIS signal is formatted in the Compatible mode protocol format 800. If however the G3 mode is being used, then the DIS signal is not inverted and the DIS signal remains in the G3 protocol format 700. Turning to FIG. 1, the inversion is accomplished by inverter 226 if it has been enabled in step 303. Otherwise, the inverter has been kept disabled in step 304 and does not perform an inversion. In either mode, the DIS signal is sent to the modem 400 from the inverter 226.

The next steps in the G3 and Compatible modes are steps 309 and 310 respectively. In these steps, Rx FAX machine 200 transmits the DIS protocol signal to the Tx FAX machine 300. As shown in FIG. 1, the DIS signal is transmitted by modem 400.

The following steps in the G3 and Compatible modes are steps 311 and 312 respectively. In these steps, Rx FAX machine 200 receives a DCS protocol signal from Tx FAX machine 300. The DCS signal will indicate in which mode the Tx FAX machine 300 will transmit the image data. Referring to FIGS. 1 and 9, modem 400 receives the DCS signal and sends it the inverter 226.

If the FAX machines 200 and 300 are using the Compatible mode, then the next step 313, shown in FIG. 8A, is to invert the polarity of the received DCS protocol signal. After the inversion, the DCS signal will be formatted in accordance with the G3 mode protocol format 700. However, if the G3 mode is being used, then no inversion takes place and the DCS signal will remain in the G3 mode protocol format with zero insertion. Turning to FIG. 1, the inversion is accomplished by inverter 226 if the Compatible mode is being used and the inverter was enabled in step 303. Otherwise, the disabled inverter performs no inversion.

In either mode, the DIS signal is sent to the SCC 234 from the inverter 226. The SCC 234 deformats the signal from the RS-232 format and sends it to the CPU 214.

In the G3 mode, the next step 314, shown in FIG. 8A, is to remove the zero bits in the symbols 704–714 of the received DCS protocol signal. However, in the Compatible mode, no zero bit removal takes place. The zero bit removal is accomplished when the phase execution handler 222 executes the zero bit removal routine 233.

If the G3 mode is being used, then in step 315 of FIG. 8A the Rx FAX machine 200 determines from the DCS protocol signal if Tx FAX machine 300 will transmit the image data in the G3 mode data format 750 or the ECM mode data format 950. However, if the Compatible mode is being used, then in step 316 the Rx FAX machine 200 determines from the DCS protocol signal if the Tx FAX machine 300 will transmit the image data in the Compatible mode data format 850 or the ECM mode data format 950. Turning back to FIGS. 1 and 9, for both steps 324 and 326, the phase execution handler 222 executes the DCS signal receive routine 266 in order to accomplish the described steps.

In steps 317–320, shown in FIG. 8A, Rx FAX machine 200 generates a CFR protocol signal. Referring back to FIGS. 1 and 9, steps 317–320 are accomplished when the phase execution handler executes the CFR signal generating routine 270.

In G3 mode protocol communications, the CFR signal will confirm that the Rx FAX machine 200 will accept the image data in the G3 mode data format 750 if the received DCS signal indicates that Tx FAX machine 300 will transmit the image data in this data format. This is shown in step 317. But, the CFR signal will confirm that the Rx FAX machine 200 will accept the image data in the ECM mode data format 950 if the received DCS signal indicates that Tx FAX machine 300 will transmit the image data in that data format. This shown in step 318.

For Compatible mode protocol communications, the CFR signal will confirm that the Rx FAX machine 200 will accept the image data in the Compatible mode data format 850 if the received DCS signal indicates that Tx FAX machine 300 will transmit the image data in this data format. This is shown in step 319. But, the CFR signal will confirm that the Rx FAX machine 200 will accept the image data in the ECM mode data format 950 if the received DCS signal indicates that Tx FAX machine 300 will transmit the image data in that data format. This is shown in step 320.

FIG. 8B shows the steps for both cases when the image data will be transmitted in the ECM mode data format 950. When this is the case, and the G3 mode is being used for protocol communications, then the next step 321, shown in FIG. 8B, is to insert zeroes in the symbols 704–714 of the CFR signal generated in step 318 of FIG. 8A. However, if the Compatible mode is being used for the protocol communications, then no zero bit insertion is done. Returning to FIG. 1, the zero bit insertion is accomplished when execution handler 222 executes the zero insertion routine 232.

As shown in FIG. 8B, if the Compatible mode is being used for protocol communications and the ECM mode will not be used to transmit the image data, then the next step 322 is to invert the polarity of the CFR signal generated in step 320 of FIG. 8A. After the inversion, the CFR signal will be formatted in accordance with the G3 mode protocol format 700. However, if the G3 mode is being used, then no inversion takes place and the CFR signal remains in the G3 mode protocol format 750 with zero insertion. The inversion takes place if the inverter 226 was enabled during step 303.

The next steps in FIG. 8B for both the G3 and the Compatible mode are steps 323 and 324 respectively. In both these steps, the Rx FAX machine 200 transmits to the Tx FAX machine 300 the CFR protocol signal indicating that the ECM mode is acceptable.

Referring to FIG. 1, the CFR signal is transmitted by modem 400. Once this is done, the monitor 218 instructs the phase execution handler 222 to begin executing the routines in the ECM mode receive phase table 262. In other words, Rx FAX machine 300 has switched to the ECM mode from either the G3 mode or the Compatible mode.

If the Compatible mode had been used for protocol communications, then the next step 325, shown in FIG. 8B, is to disable the inverter 226. And, if the G3 mode was being used for these communications, then the next step 326 is to keep the inverter 226 disabled. This is accomplished when the phase execution handler 222 executes the ECM mode initialization routine 229. In the case where the inverter 226 had been enabled in step 303 (i.e. the Compatible mode was being used for protocol communications), the inverter will be disabled by a disable signal generated by the routine 229. In the case where the inverter 226 had been kept disabled in step 303 (i.e. the G3 mode was being used for protocol communications), the inverter 226 will be kept disabled by a disable signal generated by the routine 229. In either case, the disable signal is sent from the CPU 214 to the inverter 226.

In either case where the ECM mode is being used, the next steps 327 and 328 in FIG. 8B are to receive the image data from the Tx FAX machine 300 in the ECM mode data format 950. Referring to FIG. 1, the image data is received by modem 400. From modem 400 the image data is provided to the disabled inverter 226 from where it is sent to the SCC 234. The SCC 234 deformats the image data from the RS-232 format and sends it to the CPU 214.

As shown in FIG. 8B, the next steps 329 and 330 for either case where the ECM mode is being used are to remove zero bits in the symbols 954–966 of each data frame of the image data. Turning back to FIG. 1, in order to accomplish the zero bit removal, the phase execution handler 222 executes the zero bit removal routine 233.

Then, the next steps 331 and 332, shown in FIG. 8B, are for Rx FAX machine 200 to determine if the data frames of the most recently received data block were properly received. Referring to FIGS. 1 and 10, in order to accomplish this, the phase execution handler 222 executes the ECM error detection routine 272. From the frame checking symbols 964, the routine 272 determines which frames of the data block were improperly received.

Referring back to FIG. 8A, if it is determined in step 331 and 332 that any of the data frames were not properly received, then the next steps 333 and 334 are to generate a PPR signal. The PPR signal will indicate which frames in step 331 and 332 were determined to have been improperly received so that the Tx FAX machine 300 can retransmit those data frames. The PPR signal will be generated in the ECM mode protocol format 900. Turning to FIGS. 1 and 10, this is accomplished when the phase execution handler 222 executes the PPR signal generating routine 278. The PPR signal is sent from the CPU 214 to the SCC 234 where it is formatted in the RS-232 format. From there, it is sent to the disabled inverter 226 and then to the modem 400.

The next steps in FIG. 8B for the situations where the ECM mode is being used are steps 335 and 336. In both these steps, the Rx FAX machine 200 transmits to the Tx FAX machine 300 the PPR protocol signal. Referring to FIG. 1, the PPR signal is transmitted by modem 400.

In response to the PPR signal, the Tx FAX machine 300 retransmits those data frames identified by the PPR as being improperly received. In the case where the Rx FAX machine switches from the G3 mode to the ECM mode, the steps 327, 329, 331, 333, and 335 are then repeated until it is determined in step 331 that no more data frames were improperly received. Similarly, in the case where the Rx FAX machine switches from the Compatible mode to the ECM mode, the steps 328, 330, 332, 334, and 336 are then repeated until it is determined in step 332 that no more data frames were improperly received. In the preferred embodiment, this iterative process may be repeated up to three times.

Once it is determined in steps 331 and 332 that all of the data frames have been properly received, the next steps for the two situations where the ECM mode is being used are steps 337 and 338, as shown in FIG. 8B. These steps involve generating an MCF signal which indicates that all of the data frames were properly received by the Rx FAX machine 300. Turning to FIGS. 1 and 10, this is accomplished when the phase execution handler 222 executes the MCF signal generating routine 279. The MCF signal is sent from the CPU 214 to the SCC 234 where it is formatted in the RS-232 format. From there, it is sent to the disabled inverter 226 and then to the modem 400.

The next steps 339 and 340, shown in FIG. 8B, in the two cases where the ECM mode is being used involve transmission of the MCF signal to the Tx FAX machine 300. In both these steps, the modem 400 transmits to the Tx FAX machine 300 the MCF protocol signal.

As shown in FIG. 8B, the next steps 341 and 342 are to unpack (i.e. deformat) the properly received data frames so that the image data is simply formatted in the G3 compressed image data format 750. This is accomplished when the phase execution handler executes the ECM data deformat routine 251.

The deformatted image data is then sent from the CPU 214 to the CI 212. The CI 212 sends the image data to the CPU 204 from where it is sent to the DCR 248. The DCR 248 decompresses the image data for printing.

Referring to FIG. 8B, the next steps 345 and 346 are to print the decompressed image data. This is accomplished when the phase execution handler 222 executes the print data routine 245. The routine 245 generates a print data signal which is sent from the CPU 214 to the CI 212 and then to the CPU 204 of the FCU 204. In response, the FCU 204 instructs the scanner/printer unit 246 to print the decompressed image data.

FIG. 8C shows the steps in the G3 and Compatible modes for when the image data will not be transmitted in the ECM mode. In the G3 mode, the zero bit insertion step 347 and the transmission step 349 are respectively done in the same way as in steps 321 and 323 described earlier. In the Compatible mode, the inversion step 348 and the transmission step 350 are respectively done in the same way as steps 322 and 324 described earlier.

When Rx FAX machine 200 will accept the image data in the G3 or Compatible modes, the monitor 218 will continue to point the phase execution handler 222 to the G3 /Compatible mode receive phase table 260. Thus, if the inverter 226 was earlier enabled in step 303, it will remain enabled. Similarly, if the inverter 226 was earlier disabled in step 304, it will remain disabled. In other words, the Rx FAX machine continues to use the G3 or Compatible mode for receiving the image data.

The next steps 351 and 352 in either the G3 or the Compatible mode is to receive the image data. Referring to FIG. 1, the image data is received by modem 400. From modem 400 the image data is provided to the disabled inverter 226.

Referring to FIG. 8C, if the Compatible mode is being used, the image data is inverted in step in 353. After the inversion, the image data will be formatted in the G3 data format 750. However, if the G3 mode is being used, then no inversion takes place and the image data remains in the G3 data format 750 that it was received in. The inversion takes place if the inverter 226 was enabled during step 303.

From the inverter 226, the image data is sent to the SCC 234. The SCC 234 deformats the image data from the RS-232 format and sends it to the CPU 214. From the CPU 214, the image data is sent to the CI 212 and then to the CPU 204 of the FCU 206. The CPU 204 then provides the DCR 248 with the image data. The DCR 248 decompress the image data for printing. The decompressed image data is then provided to the scanner/printer unit 246.

As shown in FIG. 8C, the next steps 356 and 357 in either mode, is to determine if the decompressed image data can be printed by the printer/scanner 246. The scanner/printer 246 determines if part of the image data was not properly received. If this is the case, it generates a signal indicating that it will not print the image data. However, if the image data was properly received, the scanner/printer 246 generates a signal indicating that it will print the image data. In either case, the signal is sent from the scanner/printer 246 to the CPU 204. The CPU 204 then provides the signal to the CPU 214 of the DIC 216 via the CI 212.

If the image data was properly received, then in steps 358 and 359, shown in FIG. 8C, for the G3 and Compatible modes, the Rx FAX machine 200 generates an MCF signal indicating that the image data was properly received and can be printed. Turning to FIGS. 1 and 9, this is accomplished when the phase execution handler 222 executes the MCF signal generating routine 280.

Referring again to FIG. 8C, if the G3 mode is being used, then the next step 360 is to insert zeroes in the symbols 704–714 of the MCF signal. However, if the Compatible mode is being used, no zero bit insertion takes place. Turning back to FIG. 1, in order to accomplish the zero bit insertion, the phase execution handler 222 executes the zero bit insertion routine 232.

In either mode, the MCF signal is then sent from the CPU 214 to the SCC 234 where it is formatted in the RS-232 format. From the SCC 234, it is sent to the inverter 226.

As shown in FIG. 8C, if the Compatible mode is being used by the FAX machines 200 and 300, then the next step 361 is to invert the polarity of the MCF signal. After the inversion, the MCF signal is formatted in the Compatible mode protocol format 800. If however the G3 mode is being used, then the MCF signal is not inverted and the MCF signal remains in the G3 protocol format 700. Turning to FIG. 1, the inversion is accomplished by inverter 226 if it has been enabled in step 303. Otherwise, the inverter has been kept disabled in step 304 and does not perform an inversion. In either mode, the MCF signal is sent to the modem 400 from the inverter 226.

The next steps in the G3 and Compatible modes are steps 362 and 363 respectively, as shown in FIG. 8C. In these steps, Rx FAX machine 200 transmits the MCF protocol signal to the Tx FAX machine 300. As shown in FIG. 1, the DIS signal is transmitted by modem 400.

Referring to FIG. 8C, the next steps 364 and 365 are to print the decompressed image data. This is accomplished when the phase execution handler 222 executes the print data signal routine 245. The routine 245 generates the print data signal which is sent from the CPU 214 to the CI 212 and then to the CPU 204 of the FCU 204. In response, the FCU 204 instructs the scanner/printer unit 246 to print the decompressed image data.

Referring back to FIG. 8C, if the image data was not properly received, then in steps 366 and 367 for the G3 and Compatible modes, the Rx FAX machine 200 generates an RTN signal indicating that the image data was improperly received and cannot be printed. Turning to FIGS. 1 and 9, this is accomplished when the phase execution handler 222 executes the RTN signal generating routine 281.

If the G3 mode is being used, then the next step 368, shown in FIG. 8C, is to insert zeroes in the symbols 704–714 of the RTN signal. However, if the Compatible mode is being used, no zero bit insertion takes place. Turning back to FIG. 1, in order to accomplish the zero bit insertion, the phase execution handler 222 executes the zero bit insertion routine 232.

In either mode, the RTN signal is then sent from the CPU 214 to the SCC 234 where it is formatted in the RS-232 format. From the SCC 234, it is sent to the inverter 226.

As shown in FIG. 8C, if the Compatible mode is being used by the FAX machines 200 and 300, then the next step 369 is to invert the polarity of the RTN signal. After the inversion, the RTN signal is formatted in the Compatible mode protocol format 800. If however the G3 mode is being used, then the RTN signal is not inverted and the RTN signal remains in the G3 protocol format 700. Turning to FIG. 1, the inversion is accomplished by inverter 226 if it has been enabled in step 303. Otherwise, the inverter has been kept disabled in step 304 and does not perform an inversion. In either mode, the RTN signal is sent to the modem 400 from the inverter 226.

The next steps in the G3 and Compatible modes are steps 370 and 371 respectively, shown in FIG. 8C. In these steps, Rx FAX machine 200 transmits the RTN protocol signal to the Tx FAX machine 300. As shown in FIG. 1, the DIS signal is transmitted by modem 400.

Once the RTN signal is transmitted, the next steps 372 and 373 are to go back to the initial step 302 in order to recover the image data which was not printable. Thus, the entire process must be done again in order to reproduce this image data at Rx FAX 200.

Alternative Embodiments

The invention was described with reference to a hardware inverter 226. However, the inversion function performed by the inverter 226 could just as easily be implemented with an optional inversion routine 290 shown in FIGS. 6, 7, 9, and 10 which is executed by the phase handler 222.

Furthermore, in the method for receiving image data, the wakeup signal receive routine 262 determined if the transmitting Tx FAX machine 300 was using the G3 or Compatible mode. However, FIG. 8D shows a variation of this method.

In this variation, the step 382 requires the user of Rx FAX machine 200 to determine with a telephone call or other communication whether the user of the Tx FAX machine 300 will use the G3 or the Compatible mode. In response, the user will select with the user interface 202 the appropriate mode. Referring to FIG. 1, the instruction signal is sent from the user interface 202 to the CPU 204 of the FCU 206. From there, it is provided to the CPU 214 of the DIC 216 via the CI 212. In response to the instruction signal, the monitor 218 of the Rx FAX machine 200 will then instruct the phase execution handler 222 to begin executing the G3 /Compatible mode receive phase table 260.

Figure 8D:
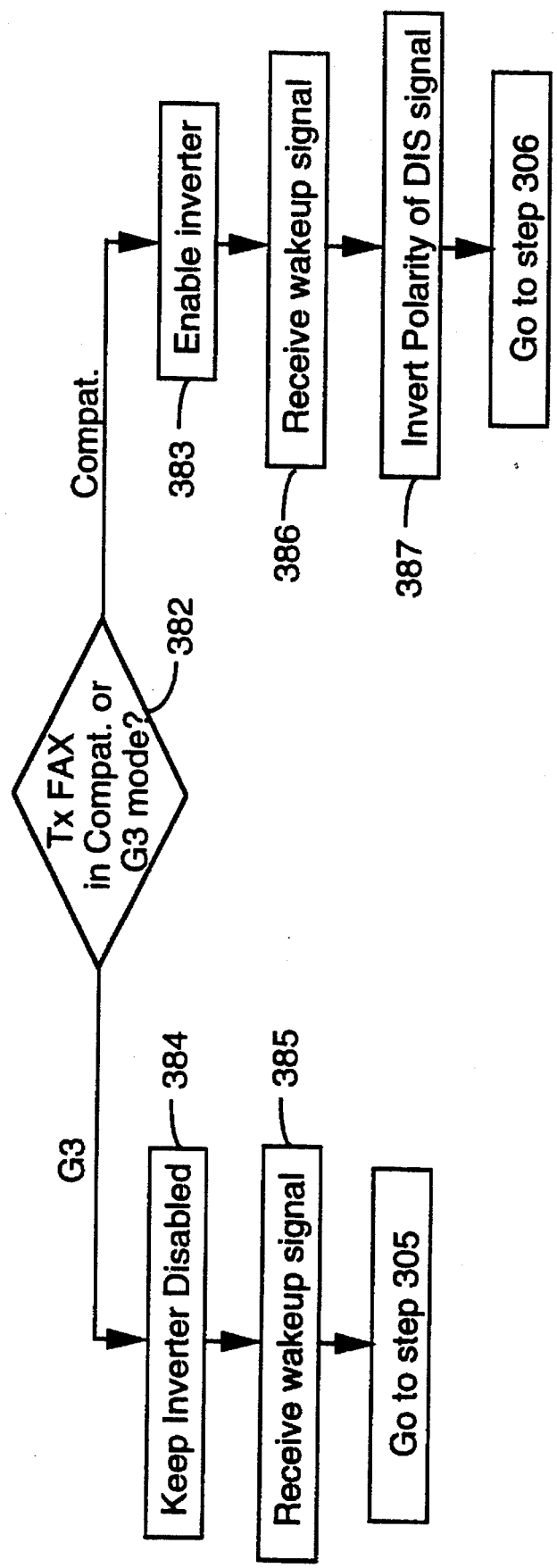

If the Compatible mode was selected, the next step 383, shown in FIG. 8D, is to enable the inverter 226. This step is the same as step 303 of FIG. 8A in the earlier described embodiment and is accomplished in the same way.

If the G3 mode was selected, the next step 384 is to keep the inverter 226 disabled. This step is the same as step 304 of FIG. 8A in the earlier described embodiment and is accomplished in the same way.

The next steps 385 and 386 respectively for the G3 and Compatible modes is to receive the wakeup call from the Tx FAX 300. These steps are the same as step 301 of FIG. 8A in the earlier described embodiment and are accomplished in the same way.

In the Compatible mode, the next step 387 is to invert the polarity of the wakeup signal. Turning to FIG. 1, the inversion is accomplished by inverter 226 if it has been enabled in step 383. Otherwise, the inverter has been kept disabled in step 384 and does not perform an inversion.

In either mode, the wakeup signal is sent to the CPU 214 via the SCC 234. Referring again to FIG. 8D, the following steps are then the steps 305–373 indicated in FIGS. 8A–8C.

Conclusion

Although the present invention was described in the context of FAX machines, the invention is applicable to other data communication apparatuses which employ the described G3, Compatible, and ECM modes. For example, the invention may be used with multifunction machines, personal computers with modems, FAX servers for mainframe computers, and audio graphic terminals for teleconferencing.

Furthermore, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for transmitting image data from a first data communication apparatus to a second data communication apparatus, said first communication apparatus including inverting means, said method comprising the steps of:

selecting a mode of operation for said first data communication apparatus from one of a G3 mode and Compatible mode;

receiving with said first data communication apparatus a protocol message transmitted by said second data communication apparatus in accordance with said selected mode;

when said selected mode is said Compatible mode, enabling said inverting means of said first data communication apparatus and inverting with said enabled inverting means the polarity of said received protocol message so that said received protocol message is formatted in accordance with said G3 mode;

when said selected mode is said G3 mode, disabling said inverting means of said first data communication apparatus so that the polarity of said received protocol message is not inverted and remains formatted in accordance with said G3 mode;

determining with said first data communication apparatus from said received protocol message formatted in accordance with said G3 mode that said second data communication apparatus will receive said image data if said image data is formatted in accordance with an ECM mode of operation;

after said determining step:

switching said first data communication apparatus from said selected mode to said ECM mode;

generating said image data with said first data communication apparatus in accordance with said G3 mode;

formatting said generated image from being formatted in accordance with said G3 mode to being formatted in accordance with said ECM mode;

when said selected mode is said Compatible mode, disabling said inverting means of said first communication apparatus so that the polarity of said generated image data is not inverted and remains formatted in accordance with said ECM mode;

when said selected mode is said G3 mode, keeping said inverting means of said first data communication apparatus disabled so that the polarity of said generated image data is not inverted and remains formatted in accordance with said ECM mode;

transmitting said image data formatted in accordance with said ECM mode to said second data communication apparatus with said first data communication apparatus.

2. The method of claim 1 further comprising the steps of after said determining step and prior to said switching step:

generating with said first data communication apparatus a protocol message formatted in accordance with said G3 mode, said generated protocol message indicating that said first data communication will transmit said image data in accordance with said ECM mode;

when said selected mode is said Compatible mode, inverting with said enabled inverting means of said first data communication the polarity of said generated protocol message so that said generated protocol message is formatted in accordance with said Compatible mode;

when said selected mode is said G3 mode, said inverting means remaining disabled so that the polarity of said generated protocol message is not inverted and remains in said G3 mode;

transmitting said generated protocol message formatted in accordance with said Compatible mode when said selected mode is said Compatible mode and formatted in accordance with said G3 mode when said selected mode is said G3 mode to said second data communication apparatus with said first data communication apparatus.

3. The method of claim 1 wherein:

said first data communication apparatus includes:

a single transmit phase table for said G3 and Compatible modes that includes an initialization routine, a protocol message receive routine, and a protocol message generate routine;

a transmit phase table for said ECM mode that includes an initialization routine, an image data generating routine, and an image data formatting routine;

said enabling and disabling steps prior to said switching step, said determining step, and said protocol message generating step respectively occur with said initialization routine, said protocol message receive routine, and said protocol message generate routine of said transmit phase table for said G3 and Compatible modes;

said enabling and disabling steps after said switching step, said image data generating step, and said image data formatting step respectively occur with said initialization routine, said image generate routine, and said image format routine of said transmit phase table for said ECM mode.

4. A method for receiving with a first data communication apparatus image data from a second data communication apparatus, said first data communication apparatus including inverting means, said method comprising the steps of:

discerning a mode of operation of said second data communication apparatus from one of a G3 mode and Compatible mode;

receiving with said first data communication apparatus a protocol message transmitted by said second data communication apparatus and formatted in accordance with said discerned mode of operation;

when said discerned mode is said Compatible mode, enabling said inverting means of said first data communication apparatus and inverting with said enabled inverting means the polarity of said received protocol message so that said received protocol message is formatted in accordance with a G3 mode of operation;

when said discerned mode is said G3 mode, disabling said inverting means of said first data communication apparatus so that said received protocol message is not inverted and remains formatted in accordance with said G3 mode;

determining with said first data communication from said received protocol message formatted in accordance with said G3 mode that said second data communication apparatus will transmit said image data formatted in accordance with an ECM mode of operation;

after said determining step:

switching said first data communication apparatus from said discerned mode to said ECM mode;

receiving with said first data communication apparatus said image data transmitted by said second data communication apparatus in accordance with said ECM mode;

when said discerned mode is said Compatible mode, disabling said inverting means of said first data communication apparatus so that the polarity of said received image data is not inverted and remains formatted in accordance with said ECM mode;

when said discerned mode is said G3 mode, keeping said inverting means of said first communication apparatus disabled so that the polarity of said received image data is not inverted and remains formatted in accordance with said ECM mode;

deformatting said received image data from being formatted in accordance with said ECM mode to being formatted in accordance with said G3 mode.

5. The method of claim 4 further comprising the steps of prior to said determining step:

generating with said first data communication apparatus a protocol message formatted in accordance with said G3 mode, said generated protocol message indicating that said first data communication apparatus will receive said image data if said image data is formatted in said ECM mode;

when said discerned mode is said Compatible mode, inverting with said enabled inverting means of said first data communication apparatus the polarity of said generated protocol message so that said generated protocol message is formatted in accordance with said Compatible mode;

when said discerned mode is said G3 mode, said inverting means remaining disabled so that the polarity of said generated protocol message is not inverted and remains in said G3 mode;

transmitting said generated protocol message formatted in said Compatible mode when said discerned mode is said Compatible mode and formatted in said G3 mode when said discerned mode is said G3 mode to said second data communication apparatus with said first data communication apparatus.

6. The method of claim 4 wherein:

said first data communication apparatus includes:

a single receive phase table for said G3 and Compatible modes that includes an initialization routine, a protocol message receive routine, and a protocol message generate routine;

a receive phase table for said ECM mode that includes an initialization routine and an image data deformat routine;

said enabling and disabling steps prior to said switching step, said determining step, and said protocol message generating step respectively occur with said initialization routine, said protocol message receive routine, and said protocol message generate routine of said transmit phase table for said G3 and Compatible modes;

said enabling and disabling steps after said switching step, said image data generating step, and said image data formatting step respectively occur with said initialization routine, said image generate routine, and said image format routine of said transmit phase table for said ECM mode.

7. A first data communication apparatus for transmitting image data to a second data communication apparatus, said first data communication apparatus comprising:

means for selecting a mode of operation for said first data communication apparatus from one of a G3 mode and Compatible mode;

means for receiving a protocol message transmitted by said second data communication apparatus in accordance with said selected mode of operation;

means for inverting;

means for enabling said inverting means when said selected mode is said Compatible mode so that said inverting means inverts the polarity of said received protocol message and said received protocol message is formatted in accordance with said G3 mode, and for disabling said inverting means when said selected mode is said G3 mode so that said received protocol message is not inverted by said inverting means and said received protocol message remains formatted in accordance with said G3 mode;

means for determining from said received protocol message formatted in accordance with said G3 mode that said second data communication apparatus will receive said image data if said image data is formatted in accordance with an ECM mode of operation;

means for switching said first data communication apparatus from said selected mode to said ECM mode when said determining means determines that said second data communication apparatus will receive said image data formatted in accordance with said ECM mode;

means for generating said image data in accordance with said G3 mode;

means for formatting said generated image from being formatted in accordance with said G3 mode to being formatted in accordance with said ECM mode;

when said selected mode is said Compatible mode, said enabling and disabling means disabling said inverting means so that the polarity of said generated image data is not inverted and remains formatted in accordance with said ECM mode;

when said selected mode is said G3 mode, said enabling and disabling means keeping said inverting means disabled so that the polarity of said generated image data is not inverted and remains formatted in accordance with said ECM mode;

means for transmitting said image data formatted in accordance with said ECM mode to said second data communication apparatus.

8. The first data communication apparatus of claim 7 further comprising:

means for generating a protocol message formatted in accordance with said G3 mode when said determining means determines that said second data communication apparatus will receive said image data formatted in accordance with said ECM mode, said generated protocol message indicating that said first data communication will transmit said image data in accordance with said ECM mode;

when said selected mode is said Compatible mode, said inverting means inverting the polarity of said generated protocol message so that said generated protocol message is formatted in accordance with said Compatible mode;

when said selected mode is said G3 mode, said inverting means remaining disabled so that the polarity of said generated protocol message is not inverted and remains in said G3 mode;

said transmitting means transmits said generated protocol message formatted in accordance with said Compatible mode when said selected mode is said Compatible mode and formatted in accordance with said G3 mode when said selected mode is said G3 mode to said second data communication apparatus.

9. The first data communication apparatus of claim 7 further comprising:

a single transmit phase table for said G3 and Compatible modes that includes an initialization routine, a protocol message receive routine, and a protocol message generate routine;

a transmit phase table for said ECM mode that includes an initialization routine, an image data generating routine, and an image data formatting routine;

said enabling and disabling means, said determining means, and said protocol message generating means respectively including said initialization routine, said protocol message receive routine, and said protocol message generate routine of said transmit phase table for said G3 and Compatible modes;

said enabling and disabling means, said image data generating means, and said image data formatting means respectively including said initialization routine, said image generate routine, and said image format routine of said transmit phase table for said ECM mode.

10. A first data communication apparatus for receiving image data from a second data communication apparatus, said first data communication apparatus comprising:

means for discerning a mode of operation of said second data communication apparatus from one of a G3 mode and Compatible mode;

means for receiving a protocol message transmitted by said second data communication apparatus and formatted in accordance with said discerned mode;

means for inverting;

means for enabling said inverting means when said discerned mode is said Compatible mode so that said inverting means inverts the polarity of said received protocol message and said received protocol message is formatted in accordance with said G3 mode, and for disabling said inverting means when said discerned mode is said G3 mode so that said received protocol message is not inverted by said inverting means and said received protocol message remains formatted in accordance with said G3 mode;

means for determining from said received protocol message formatted in said G3 mode that said second data communication apparatus will transmit said image data formatted in accordance with an ECM mode of operation;

means for switching from said discerned mode to said ECM mode when said determining means determines that said second data communication apparatus will transmit said image data formatted in accordance with said ECM mode;

said receiving means receiving said image data transmitted by said second data communication apparatus and formatted in accordance with said ECM mode;

when said discerned mode is said Compatible mode, said enabling and disabling means disabling said inverting means so that the polarity of said received image data is not inverted and remains formatted in accordance with said ECM mode;

when said discerned mode is said G3 mode, said enabling and disabling means keeping said inverting means disabled so that the polarity of said received image data is not inverted and remains formatted in accordance with said ECM mode;

means for deformatting means said received image data from being formatted in accordance with said ECM mode to being formatted in accordance with said G3 mode.

11. The apparatus of claim 10 further comprising:

means for generating a protocol message formatted in accordance with said G3 mode prior to said receiving means receiving said received protocol message, said protocol message indicating that said first data communication will receive said image data if said image data is formatted in accordance with said ECM mode;

when said discerned mode is said Compatible mode, said enabled inverting means inverting the polarity of said generated protocol message so that said generated protocol message is formatted in accordance with said Compatible mode;

when said discerned mode is said G3 mode, said inverting means remaining disabled so that the polarity of said generated protocol message is not inverted and remains in said G3 mode;

said transmitting means transmits said generated protocol message formatted in said Compatible mode when said discerned mode is said Compatible mode and formatted in said G3 mode when said discerned mode is said G3 mode to said second data communication apparatus.

12. The first data communication apparatus of claim 10 further comprising:

a single receive phase table for said G3 and Compatible modes that includes an initialization routine, a protocol message receive routine, and a protocol message generate routine;

a receive phase table for said ECM mode that includes an initialization routine, an image data generating routine, and an image data formatting routine;

said enabling and disabling means, said determining means, and said protocol message generating means respectively include said initialization routine, said protocol message receive routine, and said protocol message generate routine of said receive phase table for said G3 and Compatible modes;

said enabling and disabling means, said image data generating means, and said image data formatting means respectively include said initialization routine, said image generate routine, and said image format routine of said transmit phase table for said ECM mode.

* * * * *